United States Patent
Gebald et al.

(10) Patent No.: US 10,427,086 B2
(45) Date of Patent: *Oct. 1, 2019

(54) LOW-PRESSURE DROP STRUCTURE OF PARTICLE ADSORBENT BED FOR ADSORPTION GAS SEPARATION PROCESS

(71) Applicant: CLIMEWORKS AG, Zurich (CH)

(72) Inventors: Christoph Gebald, Regensdorf (CH); Nicolas Repond, Zürich (CH); Tobias Ruesch, Zürich (CH); Jan André Wurzbacher, Zürich (CH)

(73) Assignee: CLIMEWORKS AG, Zurich (CH)

( * ) Notice: Subject to any disclaimer, the term of this patent is extended or adjusted under 35 U.S.C. 154(b) by 126 days.

This patent is subject to a terminal disclaimer.

(21) Appl. No.: 15/667,399

(22) Filed: Aug. 2, 2017

(65) Prior Publication Data
US 2017/0326494 A1   Nov. 16, 2017

Related U.S. Application Data

(63) Continuation-in-part of application No. 14/785,152, filed as application No. PCT/EP2014/057185 on Apr. 9, 2014, now Pat. No. 9,751,039.

(30) Foreign Application Priority Data

Apr. 18, 2013   (EP) ..................................... 13164230

(51) Int. Cl.
*B01D 53/04* (2006.01)
*B01D 53/047* (2006.01)
(Continued)

(52) U.S. Cl.
CPC ..... *B01D 53/0415* (2013.01); *B01D 53/0407* (2013.01); *B01D 53/0438* (2013.01);
(Continued)

(58) Field of Classification Search
CPC ............ B01D 53/0407; B01D 53/0438; B01D 53/0415; B01D 53/0462; B01D 53/0476;
(Continued)

(56) References Cited

U.S. PATENT DOCUMENTS 3,243,942 A    4/1966  Burke
3,354,623 A   11/1967  Keller
(Continued)

FOREIGN PATENT DOCUMENTS

EP    0 766 993 A2   4/1997
GB       257879 A    1/1927
(Continued)

OTHER PUBLICATIONS

International Search Report of PCT/EP2014/057185, dated Jun. 27, 2014. [PCT/ISA/210].
Written Opinion of PCT/EP2014/057185, dated Jun. 27, 2014. [PCT/ISA/237].

*Primary Examiner* — Frank M Lawrence, Jr.
(74) *Attorney, Agent, or Firm* — Sughrue Mion, PLLC

(57) ABSTRACT

A gas separation unit for the separation of carbon dioxide from air is proposed for use in a cyclic adsorption/desorption process and using a loose particulate sorbent material. Sorbent material is arranged in at least two stacked layers, and each layer comprises two sheets of a flexible fabric material which is gas permeable but impermeable to the loose sorbent material. The sheets are arranged parallel defining an inlet face and an outlet face, are arranged with a distance in the range of 0.5-2.5 cm, and are enclosing a cavity in which the sorbent material is located. Said layers are arranged in the unit such that the inflow passes through the inlet face, subsequently through the particular sorbent material located in the cavity of the respective layer, subsequently to exit the layer through the outlet face to form the gas outflow.

25 Claims, 10 Drawing Sheets

(51) Int. Cl.
*F28F 9/26* (2006.01)
*F28F 1/12* (2006.01)
*F28F 1/32* (2006.01)
*B01J 20/24* (2006.01)
*B01J 20/28* (2006.01)

(52) U.S. Cl.
CPC ......... *B01D 53/0462* (2013.01); *B01J 20/24* (2013.01); *B01J 20/28004* (2013.01); *B01J 20/28023* (2013.01); *B01J 20/28052* (2013.01); *F28F 1/126* (2013.01); *F28F 1/32* (2013.01); *F28F 9/26* (2013.01); *B01D 2253/20* (2013.01); *B01D 2253/25* (2013.01); *B01D 2253/34* (2013.01); *B01D 2257/504* (2013.01); *B01D 2258/0283* (2013.01); *B01D 2258/06* (2013.01); *F28F 2255/12* (2013.01); *Y02C 10/08* (2013.01)

(58) Field of Classification Search
CPC ........... B01D 2253/20; B01D 2253/25; B01D 2253/34; B01D 2253/302; B01D 2257/504; B01D 2258/0283; B01D 2258/06; Y02C 10/08; F28F 1/126; F28F 1/32; F28F 2255/12; F28F 9/26; B01J 20/20; B01J 20/24; B01J 20/25; B01J 20/302; B01J 20/34; B01J 20/28004; B01J 20/28023; B01J 20/28052
USPC ............. 96/121, 129, 130, 134, 146; 95/139
See application file for complete search history.

(56) References Cited

U.S. PATENT DOCUMENTS

| | | | |
|---|---|---|---|
| 3,504,483 A | 4/1970 | Hishinuma | |
| 3,576,095 A | 4/1971 | Rivers | |
| 3,873,287 A | 3/1975 | Barnebey | |
| 4,022,581 A | 5/1977 | Rudorfer | |
| 4,133,660 A | 1/1979 | Steiner | |
| 4,216,003 A | 8/1980 | Diachuk | |
| 6,379,437 B1 | 4/2002 | Heinonen et al. | |
| 6,533,847 B2 | 3/2003 | Seguin | |
| 8,163,066 B2 | 4/2012 | Eisenberger | |
| 8,202,350 B2 | 6/2012 | Asaro et al. | |
| 9,751,039 B2 * | 9/2017 | Gebald | B01D 53/0446 |
| 2009/0120288 A1 | 5/2009 | Lackner et al. | |
| 2011/0088550 A1 * | 4/2011 | Tirio | B01D 53/02 95/96 |
| 2011/0146487 A1 | 6/2011 | Celik et al. | |
| 2012/0152116 A1 * | 6/2012 | Barclay | B01D 53/06 95/113 |
| 2012/0174778 A1 | 7/2012 | Eisenberger | |

FOREIGN PATENT DOCUMENTS

| | | |
|---|---|---|
| WO | 2009/148872 A2 | 12/2009 |
| WO | 2010/022339 A2 | 2/2010 |
| WO | 2010/027929 A1 | 3/2010 |
| WO | 2010/091831 A1 | 8/2010 |
| WO | 2012/168346 A1 | 12/2012 |

* cited by examiner

LOW-PRESSURE DROP STRUCTURE OF PARTICLE ADSORBENT BED FOR ADSORPTION GAS SEPARATION PROCESS

This application is a continuation-in-part of U.S. application Ser. No. 14/785,152 filed Oct. 16, 2015 which is a National Stage of International Application No. PCT/EP2014/057185 filed Apr. 9, 2014, claiming priority based on European Patent Application Ser. No. 13 164 230.8, filed Apr. 18, 2013, the contents of all of which are incorporated herein by reference in their entirety.

TECHNICAL FIELD

The present invention relates to sorbent bed structures for gas separation processes and the use of such structures for gas separation, for example for the separation/capture of $CO_2$ from gas streams.

PRIOR ART

Gas separation by adsorption has many different applications in industry, for example removing a specific component from a gas stream, where the desired product can either be the component removed from the stream, the remaining depleted stream, or both. Thereby both, trace components as well as major components of the gas stream can be targeted by the adsorption process.

One important application is capturing carbon dioxide ($CO_2$) from gas streams, e.g., from flue gases, exhaust gases, industrial waste gases, or atmospheric air.

Capturing $CO_2$ directly from the atmosphere, referred to as direct air capture (DAC), is one of several means of mitigating anthropogenic greenhouse gas emissions and has attractive economic perspectives as a non-fossil, location-independent $CO_2$ source for the commodity market and for the production of synthetic fuels. The specific advantages of $CO_2$ capture from the atmosphere include: (i) DAC can address the emissions of distributed sources (e.g. cars, planes), which account for a large portion of the worldwide greenhouse gas emissions and can currently not be captured at the site of emission in an economically feasible way; (ii) DAC can address emissions from the past and can therefore create truly negative emissions; (iii) DAC systems do not need to be attached to the source of emission but are rather location independent and can for example be located at the site of further $CO_2$ processing; and (iv) if $CO_2$ that was captured from the atmosphere is used for the production of synthetic hydrocarbon fuels from renewable energy sources, truly non-fossil fuels for the transportation sector can be obtained, that create no or very few net $CO_2$ emissions to the atmosphere.

Several DAC methods have recently been developed based on various technological approaches. For example, U.S. Pat. No. 8,163,066 B2 discloses carbon dioxide capture/regeneration structures and techniques; US 2009/0120288 A1 discloses a method for removal of carbon dioxide from air; US 2012/0174778 discloses a carbon dioxide capture/regeneration method using a vertical elevator; and WO2010022339 discloses a carbon dioxide capture method and facility.

One particular approach is based on a cyclic adsorption/desorption process on solid, chemically functionalized sorbent materials. For example, in WO2010/091831 a structure based on amine functionalized solid sorbent materials together with a cyclic adsorption/desorption process using this material for the extraction of carbon dioxide from ambient air is disclosed.

Therein, the adsorption process takes place at ambient conditions at which air is streamed through the sorbent material and a portion of the $CO_2$ contained in the air is chemically bound at the amine functionalized surface of the sorbent. During the subsequent desorption, the material is heated to about 50-110° C. and the partial pressure of carbon dioxide surrounding the sorbent is reduced by applying a vacuum or exposing the sorbent to a purge gas flow. Thereby, the previously captured carbon dioxide is removed from the sorbent material and obtained in a concentrated form.

In WO2012/168346A1, a sorbent material based on amine functionalized cellulose is disclosed, which can be used for the above described process.

Generally, for adsorption-based gas separation processes, configurations of the sorbent material are desired which impose little pressure drop on the gas flow in order to minimize the energy required for gas pumping and at the same time achieve maximum contact between the sorbent and the gas stream in order to maximize the mass transfer rates of the components to be removed from the gas stream. Typical configurations include packed bed columns or fluidized beds with typical lengths of several ten centimeters to several meters, which typically impose pressure drops of several thousand Pascal up to several bars on the gas flow.

The requirement on the pressure drop can become even more severe, if trace components are removed from a gas stream. In particular, all DAC approaches have one major challenge in common which are the very large air volumes that have to be passed through any capture system in order to extract a certain amount of $CO_2$ from the air. The reason for this is the very low concentration of $CO_2$ in the atmospheric air, currently between 390 and 400 ppm, i.e., roughly 0.04%. Thus, in order to extract one metric ton of $CO_2$ from the atmosphere, at least about 1,400,000 cubic meters of air have to be passed through the capture system. This in turn means that economically feasible capture systems must have a very low pressure drop on the air flow passing through them. Otherwise the energy requirements for air pumping will render the system uneconomical. However, any low-pressure drop configuration should not compromise the mass transfer properties of the system.

While many materials that have promising properties for a DAC process are typically in a granular form, their arrangement in a conventional packed bed column or in a fluidized bed with a length of typically several ten centimeters to several meters will usually not be feasible, since the resulting pressure drops will exceed the tolerable limits by one or several orders of magnitude.

On the other hand, in the field of particle filters for gas streams, in particular soot particle filters for exhaust gases, channeled filter structures were developed, typically referred to as "wall flow" filters, see for example EP 0 766 993 A2. In these structures the gas flow enters the structure through inlet channels, passes porous walls, at which the soot particles are trapped, and exits the structure through outlet channels.

Monolithic structures comprising sorbent materials were also developed in the context of gas separation and adsorption (e.g. WO2010/027929 A1, U.S. Pat. No. 8,202,350 B2).

SUMMARY OF THE INVENTION

The present invention relates to a structure of a particulate sorbent bed for gas separation by adsorption that can achieve both, a very low pressure drop on the gas flow passing through the structure and very high mass transfer rates between the gas phase and the surface of the sorbent material. The basic underlying principle of the structure of the present invention is an arrangement in which the particles of the sorbent material form a very short packed bed, for example with a length of 0.5 to 2.5 cm, through which the gas stream to be separated is passed. However, such a bed arranged in a single layer would result in very large, technically and economically unfeasible geometries of the overall sorption system.

Accordingly, a gas separation unit for the separation of a first gas, typically carbon dioxide, from a mixture containing said first gas as well as further gases different from the first gas, typically the mixture being air or flue gases, is proposed for use in a cyclic adsorption/desorption process and further using a loose particulate sorbent material for gas adsorption. In this unit, said particulate sorbent material is arranged in at least two stacked layers, and each layer comprises two sheets of a flexible fabric material which is gas permeable but impermeable to the loose particulate sorbent material, which sheets are either mounted on a stiff frame structure or which form the layer in a self-supporting way using spacers or distance elements between them, are arranged essentially parallel defining an inlet face of the layer and an outlet face of the layer, are arranged with a distance in the range of 0.5-2.5 cm, and are enclosing a cavity in which the particulate sorbent material is located. The proposed unit has a gas inlet side or gas inlet manifold through which an inflow of gas mixture enters the unit and a gas outlet side or gas outlet manifold through which a gas outflow exits the unit, the gas pathway between the inflow and the outflow being confined in the unit to pass through at least one layer. In other words the gas entering the unit in any case must pass through one of the layers and there is no bypass under normal adsorption operation, bypass may be allowed by corresponding valves for cleaning and/or desorption processes.

Said layers are arranged in the unit such that the inflow passes through the inlet face, subsequently through the particular sorbent material located in the cavity of the respective layer, subsequently to exit the respective layer through the outlet face (to form the gas outflow). Further the layers are arranged such that inlet faces of adjacent layers are facing each other enclosing gas inlet channels and such that outlet faces are facing each other enclosing gas outlet channels. The mean distance (being defined as the mean over the distances over the full surface facing faces) between inlet faces and/or outlet faces defining said channels, measured in a direction essentially perpendicular to a main gas inflow direction and a main gas outflow direction, respectively, is in the range of 0.5-5 cm. Furthermore the length of the inlet face and/or of the outlet face in a direction parallel to the main gas inflow direction and the main gas outflow direction, respectively, is at least ten times (or even 40, 50, 80 or 100 times) larger than distance between the sheets in the layer.

Prior art units in contrast to the present proposal (see e.g. WO2009/148872 A2, U.S. Pat. No. 6,379,437 B1) use particulate sorbent materials embedded into structured adsorbent beds through which the gas flow is passed through straight flow-through channels. In these adsorbent bed configurations the species to be removed from the gas stream by adsorption has to be transported from the gas stream to the adsorbent material by diffusion, essentially perpendicular to the flow direction of the gas stream. The gas flow in these devices is not forced to pass through corresponding sorbent material layers before exiting the device. However, if species are to be removed from the gas stream at very low concentrations (such as $CO_2$ in air) the concentration gradients from the gas stream to the sorbent bed are small which limits the achievable mass transfer rates and requires long residence times, which in turn can render the process uneconomical.

With the structure disclosed in the present invention in which the gas flow is directed through and forced through the channels walls composed of the granular sorbent material, the mass transfer limitations by diffusion can be overcome and the mass transfer rates, e.g., of $CO_2$ from an air stream to the sorbent material surface, can be significantly increased with regards to prior art. At the same time, pressure drop across the structure of the present invention can be kept low as opposed to conventional packed column bed configurations.

Further, since some prior art, e.g., WO2009/148872 A2, relies on diffusion of the adsorbed species from the main gas flow into a sorbent material layer, the thickness of the sorbent material layers of these prior art structures is typically suggested to be very small, i.e., preferably 3 mm in order to minimize mass transfer limitations. However, such thin sorbent material layers are expensive to manufacture and are delicate and not long-lasting. One important advantage of the present invention is the fact that structures that are more easily producible, i.e., structures comprising thicker sorbent material layers (e.g. 0.5 to 2.5 cm) than suggested in prior art, are employed in a way that the mass transfer of the species to be adsorbed to the surface of the sorbent material is not compromised (since the gas flow passes through the sorbent material layer), which would be the case if diffusion based, prior art structures would be implemented with thicker, more easily producible sorbent material layers.

Further prior art devices (e.g. WO2010/027929 A1, U.S. Pat. No. 8,202,350 B2) utilize structures in which the gas flow can be guided through layers of porous sorbent materials but these structures are based on extruded monolithic structures which are essentially 2-dimensional structures extruded in a third dimension. In these structures, the sorbent material is in a monolithic structure, e.g., in a gel form or deposited on the channel walls, so it is not loose. Further, the structures are typically extruded from a single material and the extrusion process does not allow combination of arbitrary materials to build up the structures.

There are several advantages of the structures of the present invention over prior art extruded monolithic structures.

Firstly, structures based on extruded monoliths cannot represent more complex 3-dimensional structures such as a stack of individual layers with loose particular sorbent material confined by flexible fabric sheets. This in turn means that the prior art structures cannot represent the geometries of the structures of the present invention, for example a heat transfer structure connected to tubing and being embedded into a sorbent material layer enclosed between two layers of a fabric material (see below).

Secondly, the prior art structures cannot be easily built up from various different material combinations, as the structures of the present invention, with the corresponding advantages listed in detail below, such as optimized thermal mass/heat capacity, optimized thermal conductivity of a heat transfer structure, etc. In particular, incorporation of a flexible fabric material enclosing the sorbent layers, in contrast to prior art, allows for (i) using flexible and to a certain extend stretchable fabric sheets holding the sorbent material in the shape of a thin, uniform layer, even if the volume of the particle layer shrinks or expands to some extend during operation (e.g., through drying and wetting of the material); and (ii) tailoring the fabric sheets to be just impermeable to the sorbent material particles but at the same time to be very thin and impose a very low pressure drop on the gas flow through them. In contrast, fixed, stiff channels walls of prior art monolithic structures (i) cannot adapt to a shrinking and/or expanding sorbent packing, and (ii) will typically either be thicker or have less porosity for the gas flow to pass through than optimized flexible fabric sheets since the former will require a more dense structure in order to maintain their stiff structure.

Thirdly, prior art monolithic structures are likely to be subject to a significant amount of flow by-passing the layers of sorbent material, leading to a reduced mass transfer rate during the adsorption process. This is due to the fact that at those locations at which sorbent material is in contact with rigid structures such as the walls of the monolith, small cavities in the sorbent material are likely to form (for example during the filling or coating process), which reduce the resistance on the air flow at these locations and in turn induce a by-pass flow through them. In the structure of the present invention, the number of walls inside the packing of the sorbent material can be kept substantially smaller compared to prior art monolithic structures.

Fourthly, the proposed use of loose particulate adsorption material in combination with flexible fabric for bordering the layers and in combination with the stacked arrangement with specifically chosen layer thicknesses and channel widths allows providing for a very robust, low-pressure drop, easy to handle and low manufacturing cost device with high efficiency of the adsorption and desorption process, where its geometry can be specifically tailored to the process-specific needs. This is in contrast to monolithic structures where the sorbent material is provided not in loose form but in a solidified porous monolithic form, which structures are much more restricted through the manufacturing process, and, due to the fixed local arrangement of the sorbent material in the channels or at their walls, respectively, do not allow for easy manufacturing, easy cleaning, repowering etc. In particular, the stacked unit of the present invention can be substantially arbitrarily extended into one direction perpendicular to the main direction of the gas flow (which is, the direction of stacking) without complicating the manufacturing process. This is in contrast to a prior art extruded monolithic structure, which requires larger die-plates if the dimensions perpendicular to the main direction of the gas flow are enlarged.

Moreover, there can be further advantages of the structure of the present invention over prior art extruded monolithic structures due to the above listed fundamental differences in their construction.

The orientation of such a stack can be such that the planes of the individual layers are essentially horizontal planes. Between the layers there are therefore in this case horizontal slots for the entry of the inflow of the gas mixture and horizontal slots for the outflow of the gas depleted in $CO_2$. Such a substantially horizontal stack configuration can be selected to avoid the formation of holes in the layers due to the motion of the sorbent material during operation. Such holes can lead to bypassing of a large portion of the main airflow as they can form a significantly lower pressure drop region.

In some cases however it has been observed that also in such a substantially horizontal configuration, hole formation can occur and a more controlled formation of holes can be realized in a vertical orientation of the stack.

According to another embodiment therefore the layers can be placed vertically—the complete stack is so to speak rotated 90° around the main horizontal axis of the whole unit. According to this embodiment, the at least two stacked layers with the particulate sorbent material, or preferably in case of more than two layers all the layers, each layer comprising two sheets of a flexible fabric material which is gas permeable but impermeable to the loose particulate sorbent material, are oriented vertically, i.e. such that the plane normals of the layers are oriented horizontally. In other words in this orientation between the layers there are vertical slots for the entry of the inflow of the gas mixture and vertical slots for the outflow of the gas depleted in $CO_2$. In this manner any relocation/motion of sorbent nevertheless leads to a homogenous bed due to the weight of the sorbent material and the corresponding downward motion of the particles which closes any formed holes in a self-ordering process. In order to avoid that formed holes at the upper edge of the layer lead to bypassing, a slat made preferably of aluminum can be affixed at the upper edge being oriented along the upper edge of the layer on the inflow and outflow face of the layer, in contact with the outer surface of the layer, covering and thereby blocking a portion of the layer—and any potentially formed holes—to inflow and thusly forcing all inflow through the sorbent material layer containing sufficient sorbent particles in this region. The width of the slat can be in the range of 1 to 15 cm, preferably 2 to 10 cm.

Also intermediate rotated stack orientations are possible, where the plane normals are oriented in a plane perpendicular to the inflow direction, e.g. orientations where the slots for the entry of the inflow of the gas mixture and slots for the outflow of the gas depleted in $CO_2$ are between the horizontal or the vertical direction, e.g. at 45°.

According to a first preferred embodiment of the proposed unit the length of the inlet face and/or of the outlet face in a direction parallel to the main gas inflow direction and the main gas outflow direction, respectively, is at least 40 times larger than distance between the sheets in the layer.

According to yet another preferred embodiment, the flexible fabric material is woven or nonwoven textile material, preferably based on polymeric fibres or yarns, respectively, most preferably based on fibres or yarns, respectively based on PET and/or PE, or the flexible fabric material is made from a cellulose based, in particular paper material. The layers of the flexible fabric material have a preferred thickness of 25 to 500 μm.

Preferentially, more than 5, preferably more than 10, most preferably more than 20 layers are either stacked essentially parallel to each other in the unit, preferably by using a stack of corresponding frames; and/or are stacked under relative inclination angles in the range of 0.2-15°, preferably in the range of 0.5-10°. In the latter case, the corresponding inlet channels can be arranged to be converging in the main gas inflow direction and the corresponding outlet channels widening in the main gas outflow direction. The inlet channels can in this case essentially be closed at their downstream ends by lateral edges of adjacent layers being in (direct) contact with each other and in that the outlet channels are closed at their upstream end by lateral edges of adjacent layers. In other words the layers are arranged, looking at the unit in a direction perpendicular to the gas flow and parallel to the plains of the layers, in a zigzag manner.

The layers can be essentially planar structures stacked essentially parallel to each other, or wherein the layers can be essentially cylindrical or oval structures, most preferably arranged concentrically to each other.

Spacers can be located within said layers for defining the distance between the faces of layer, the spacers preferably being rigid bar or rail structures, most preferably T, H, C, or Z-bar structures, or being provided by junctures and/or seams between the sheets.

At least one layer, preferably the majority of the layers, most preferably all layers can be provided with primary heat exchange elements, preferably in the form of tubing containing a heat exchange fluid, most preferably in combination with secondary heat exchange elements for increasing the heat transfer between the sorbent material and the heat exchange elements.

Further, according to a preferred embodiment, the primary heat exchange elements can be a plurality of meandering tubes for a heat exchange fluid provided within a stiff rectangular circumferential frame structure and within the cavity, wherein the plurality of tubes over the non-bent portions thereof are all being arranged essentially parallel to a first pair of mutually parallel metal profiles forming the stiff frame structure.

Said tubes can be in thermal contact with secondary heat exchange elements in the form of a plurality of sheets of metal which are arranged parallel to each other and which are arranged essentially perpendicular to a main plane of the stiff frame structure and perpendicular to said tubes (to the non-bent portions thereof), the tubes extend in a continuous manner between said first pair of mutually parallel metal profiles and the secondary heat exchange elements in the form of sheet of metal are provided with a plurality of holes through which the plurality of tubes penetrate.

The tubes of the primary heat exchange element are preferably metal tubes, preferably aluminum or copper tubes. These tubes can be provided with an inner diameter in the range of 3-20 mm, preferably in the range of 5-12 mm, and/or with an outer diameter in the range of 4-24 mm, preferably in the range of 6.2-14 mm.

The tubes of the primary heat exchange element are typically, where running parallel, spaced by a distance (x) in the range of 10-168 mm, preferably in the range of 15.5-98 mm.

The sheets of metal if forming the secondary heat exchange elements according to a preferred embodiment have a thickness in the range of 0.1-0.4 mm, preferably in the range of 0.12-0.18 mm.

The sheets of metal if forming the secondary heat exchange elements according to another preferred embodiment have a height (h), measured perpendicular to the running direction of the tubes in the range of 3-50 mm, preferably in the range of 8-22 mm.

The sheets of metal if forming the secondary heat exchange elements according to a preferred embodiment have a length being less than 20 mm, preferably less than 5 mm shorter than the distance between the respective pair of metal profiles arranged pairwise mutually parallel forming said stiff rectangular circumferential frame structure.

Preferably the sheets of metal are made of aluminum.

Typically, the sheets of metal if forming the secondary heat exchange elements are spaced by a distance (d) in the range of 1-6 mm, preferably in the range of 3.5-5.5 mm.

As concerns the dimensioning of the tubes and the metal sheets the above mentioned values are an optimum compromise allowing for good interpenetration by the particulate sorbent material, also allowing filling of the structure in the manufacturing process, and on the other hand allowing for sufficient porosity for the air passing through the layer, and allowing for an efficient as possible heat transfer process for the heating and cooling steps in the cyclic temperature swing carbon dioxide capture process.

The tubing forming the primary heat exchange pipes can also have, at least in sections, a non-circular cross-section (flattened shape). Quite specifically, the first outer diameter of the cross section of the pipes in a direction perpendicular to the plane of the layer of the stiff frame structure can be at least twice as large as the second outer diameter of the cross section of the pipes in the longitudinal direction. By providing piping which is "slim" in the plane of the layer of the stiff frame structure the pipes appearing like upright partitioning walls in the cavity, an essentially planar surface is provided at the face of adjacent pipes, allowing for most efficient attachment of and heat exchange with secondary heat exchange elements in the form of heat exchange metal sheets and/or the sorbent as will be detailed as follows.

This design of the flattened pipes results in two substantial advantages over heat exchange pipes with a circular cross section: First, the area that is available for gas flow through the planes of the sheets of flexible fabric material is much larger since a smaller portion of this flow cross-section area is blocked by the pipes. This results in reduced pressure drop on the gas flow. Second, the pipes can be spaced closer to each other compared to prior art designs with circular pipe cross sections while the area available for gas flow still remains larger compared to those prior art designs. This results in an optimized heat transfer design since the distances for heat transfer through the sorbent material between the flattened pipes is reduced.

Said flattened pipes can further be in thermal contact with sheets of metal forming the secondary heat exchange element and which are arranged essentially perpendicular to the main plane of the stiff frame structure, and which extend oscillating between pairwise adjacent flattened pipes, thereby contacting them for thermal contact. In other words these metal sheets are either wavy oscillating between adjacent flattened pipes and contacting the flat small-diameter surfaces, or zigzagging between adjacent flattened pipes and contacting the flat small-diameter surfaces.

As an alternative to the sheets of metal or in addition to these said flattened pipes can be held in place with spacers which are arranged essentially perpendicular to the main plane of the frame, and which at least extend between pairwise adjacent flattened pipes.

The primary heat exchange elements and/or the secondary heat exchange elements can also act as frame structure and/or sheets. The primary and/or secondary heat exchange elements can be integrated into the frames structure thereby stiffening them and preventing sagging. Further the primary and/or secondary heat exchange elements can be bonded with the fabric material to prevent bulging when filled with sorbent material and in certain combinations to stiffen the frame structures.

The primary heat exchange elements and/or the secondary heat exchange elements can furthermore be based on an expanded material, preferably on an expanded metal, for example a corrugated expanded metal.

The loose particular sorbent material is preferably an amine-modified particular material, preferably based on a weak base ion exchange resin, specifically polystyrene matrix material modified with amine groups, specially primary amine groups, or based on cellulose, more preferably based one amine-modified nanofibrilated cellulose, in each case preferably with an average particle diameter in the range of 60 to 1200 µm, for the adsorption of carbon dioxide.

The frame can be provided with holes into which the loose particular sorbent material is filled and the holes of which holes are closed after filling in the sorbent material.

The unit may furthermore comprise a surrounding enclosure or cage, preferably made of a flexible (bag like) or a stiff (frame cage like) material, which, apart from gas inlet openings for the inflow and gas outlet openings for the outflow is gastight, and which is preferably attached to a vacuum unit for the desorption process, wherein preferably inlet openings and/or outlet openings are provided with controllable lids or valves for changing between adsorption and desorption stages. This feature facilitates operation of the structure of the present invention in a cyclic adsorption/desorption process where during adsorption air is flowing through the structure through said lids or valves and during desorption the structure is sealed towards the environment and can be heated up and/or exposed to reduced or elevated pressure and/or exposed to different atmospheres, such as a purging gas.

The sheets of each layer are preferably located at a distance in the range of 0.5-1.5 cm, and/or wherein the mean distance between adjacent inlet faces and/or outlet faces (i.e., the width of the channels), measured in a direction essentially perpendicular to a main gas inflow direction and the main gas outflow direction, respectively, is in the range of 0.5-1.5 cm.

Furthermore the present invention relates to a use of such a unit for extracting carbon dioxide from air and/or flue gas from exhaust gases.

Further embodiments of the invention are laid down further below as well as in the dependent claims.

The stack formed by the multiple layers of sorbent material can have various geometrical forms, e.g., rectangular (FIG. 1, FIG. 6), cubic, or cylindrical (FIG. 7). The gas inlet side through which the gas flow enters the structure can either be formed by a gas inlet manifold or can be open to the environment. The gas outlet side through which the gas flow exits the structure can either be formed by a gas outlet manifold or can be open to the environment.

According to one embodiment of the present invention, the two layers of flexible fabric material enclosing the particulate sorbent material are mounted on stiff frame structures (for example produced by injection molding of a plastic material) which form the geometrical shape of the sorbent layers. (FIG. 1)

According to another embodiment of the present invention, the two layers of preferably flexible fabric material form the layer of sorbent material without utilization of a stiff structure but rather by employing several spacers or distance pieces between the two layers of fabric material. Those spacers can be of various geometrical shapes and can be made of various materials. In one embodiment, the distance holders can be small plastic cylinders with the length of the thickness of the sorbent layer. In another embodiment the spacers can be made of yarn of filaments and the two layers of fabric can be hold together by stitching.

One advantage of the present invention is that by stacking the very thin sorbent layers the particulate sorbent material can be arranged in a geometrically compact form, while the length of the flow path of the gas through the sorbent material is relatively small. The present invention applies thereby the principle of arranging very large surface areas in the compact form of a stack that is known from wall flow-type monolithic structures to a structure that is build up from a particulate material.

For example, if 1 m$^3$ of sorbent material are arranged in a single packed bed with a bed length of 1 cm, this will result in a bed cross section area of 100 m$^2$, e.g., 10 m×10 m. On the other hand, if the same amount of material is arranged in 100 stacked layers, each of 1 cm thickness and 1 m$^2$ area, with 1 cm wide inlet and outlet channels between them, this will result in overall stack dimensions of 1 m×1 m×2 m, which is much more compact and has therefore a much smaller footprint. At the same time, the stacked arrangement significantly facilitates gas distribution. While even distribution of a gas stream towards the bottom area of a 100 m$^2$ large bed will require excessive ducting, the ducting required to guide a gas flow towards the inlet of a 1 m×1 m×2 m stack will be relatively small. This consideration illustrates at the same time that—in order to benefit from the compactness of a stack arrangement—the length of the sorbent layers and the gas inlet and outlet channels in the main direction of the gas flow (parallel to the sorbent layers) needs to be significantly larger, for example at least 10 times larger, than the thickness of the sorbent layers.

Another advantage of the present invention is that due to the fact that the structure is built up as a stack of individual layers (as opposed to other, prior art flow structures that are for example extruded or cast from a single material) the structure can be built from various materials and various material combinations. For instance, a frame defining the geometrical structure of the layers of sorbent material can be made from a stiff, mechanically stable, lightweight material, while the two layers of preferably flexible fabric material enclosing the sorbent material layer can be made from a different material with the desired permeability properties for the air flow and the sorbent material particles. For instance, while the material forming the geometry of the sorbent layers can be a stiff material, the material forming the two fabric layers enclosing the sorbent material layer can be a flexible material which can enable different forms of the sorbent material layer, e.g., a bag-like form with curved outer surfaces. It can further compensate for changes in volume of the sorbent material packing due to shrinking or expansion of the particles during the process as outlined above. This in turn allows for several different geometries of the sorbent material layer which could not be obtained with stiff layers enclosing the sorbent material. At the same time, a heat transfer structure that can be contained in the sorbent material layer can be made from yet another material with favorable thermal properties, e.g., a high thermal conductivity.

According to one aspect of this invention, material combinations that minimize the thermal mass of the overall structure can be used. Such a design is advantageous since it reduces the energy consumption, if the structure is used within a cyclic, temperature-swing process. According to one preferred embodiment of the present invention, the structure disclosed herein is used for the extraction of CO2 from atmospheric air. Within this preferred embodiment, the structure is operated in a cyclic adsorption/desorption process where during the adsorption step air is ventilated through the structure and a portion of the CO2 contained in the air is bound at the surface of the sorbent material contained in the sorbent material layers of the structure. Under typical process conditions, the adsorption step takes 2 hours, in average about 40% of the CO2 in the air stream is extracted and about 0.3 mol CO2 are adsorbed per dm$^3$ of sorbent material. From these values, the air velocity u$_{air}$ through the sorbent layer can be determined as a linear function of the sorbent layer thickness d and is roughly $$u_{air}(m/s) = 0.03 \text{ m}/(s*cm)*d(cm)$$

At the same time, for a typical sorbent material the pressure drop through the sorbent layer Δp is roughly a linear function of the air velocity and the sorbent layer thickness as follows:

$$\Delta p = 1.2 \text{ kPa/cm/(m/s)} * u_{air}(\text{m/s}) * d(\text{cm})$$

Therefore, the total pressure drop increases with the square of the sorbent layer thickness. For a thickness of 1 cm, the resulting total pressure drop is around 36 Pa, while for a thickness of 5 cm it is around 900 Pa, which is already about one order of magnitude too large for an economic DAC application. On the lower limit, sorbent layer thicknesses well below 0.5 cm become very expensive to manufacture. This in turn implies that the relatively narrow range of the preferred sorbent layer thickness of 0.5 to 2.5 cm is an important aspect of the present invention which is by no means obvious from prior art.

However, while the application of the structure disclosed herein for the extraction of CO2 from atmospheric air is one preferred embodiment of the present invention, it is important that the present invention is not restricted to this application. Rather, the structure of the present invention can also be used in other applications such as the separation of CO2 from flue gases, exhaust gases, industrial waste gases or the separation of other components than CO2 from these or other gas streams.

According to one embodiment of the present invention, the gas inlet and outlet channels are formed by stiff frame structures (for example produced by injection molding of a plastic material) which form the geometrical shape of the sorbent layers, onto which further the two layers of flexible fabric material enclosing the sorbent material are mounted. One important functionality of the stiff frame structures in this embodiment is the fact that they provide enough surfaces (e.g. rods, bar or rail structures within the frame) to glue or weld the flexible fabric material to, which in turn provides sufficient tension to the flexible fabric material to hold the sorbent material in a layer with relatively uniform thickness. The stiff frame structures can contain spacers that fix the distance between two frame structures which at the same time is the width of the inlet and outlet channels between the two frame structures. The stiff frame structures can further contain structures that seal the inlet and outlet channels towards the outside of the structure (except for their inlet/outlet surfaces). The inlet and outlet channels can be formed by stacking the frames on top of each other.

According to one embodiment of the present invention the layers of the particulate sorbent material are stacked in a zigzag manner as described above (FIG. 2). The advantage of this embodiment is the fact that the gas velocity in the gas inlet and outlet channels is more uniform along the main flow direction of the gas flow than it is for the case of gas inlet and outlet channels with constant width. This is because the gas volume flow decreases along the gas inlet channels in the main flow direction, since portions of the gas stream exit the inlet channel through the sorbent material layer. At the same time, the volume flow increases along the gas outlet channels in the main flow direction, since portions of the gas stream enter the outlet channel from the sorbent material layer. This embodiment results in a more uniformly distributed pressure gradient across the sorbent material layer in the structure of the present invention and therefore more uniformly distributed flow through the sorbent material layer, which ensures most efficient utilization of the sorbent material during the adsorption process.

According to a preferred embodiment of the present invention, the structure of the present invention comprises a primary heat transfer structure and preferably a secondary heat transfer structure which are preferably placed within or at the side of the sorbent material layer (FIG. 3). The heat transfer structures can be made from a material with high thermal conductivity, for example a metal, for example copper or aluminum. For example, the secondary heat transfer structure can consist of one or several layers or sheets of a permeable structure placed inside the sorbent material. These sheets can for example consist of perforated metal, expanded metal, wire mesh, metal grid or grating. Further, the secondary heat transfer structure can consist of a honeycomb structure, for example an aluminum honeycomb structure.

One possible secondary heat transfer structure for use within the sorbent material layers is based on fins or metal sheets aligned preferably essentially perpendicularly to the planes of the particulate sorbent material layer. If the latter are essentially horizontally aligned, the fins are vertically aligned. If the particulate sorbent material layers are essentially vertical, the fins or metal sheets of the secondary heat transfer structure are oriented horizontally. In this concept, vertical fins forming the secondary heat transfer structure are mechanically bonded with the primary heat transfer structure comprising or consisting of preferably aluminum tubing.

The incorporation of vertical fins—perpendicular to the fabric material plane—as a secondary heat transfer structure in the sorbent material layers and frames is schematically shown in FIG. 20. Firstly, as most fin and tube heat exchangers are heat transfer limited on the gas side, they have a very large surface area of fins which necessitates thin gaps between fins on the order of 1 mm. As has been determined by thermal simulations, the preferred conduction distance in a sorbent material used for DAC applications is about 3-8 mm or 5 mm resulting in a distance between heat transfer structures of preferably 4-15 mm, more preferably in the range of 5-12 mm or 10 mm. 5-12 mm or 10 mm spacing between fins of the secondary heat transfer structure represents a good and preferred compromise between the thermal mass of the heat transfer structure and the heat transfer effectiveness and makes these structures therefore suitable for DAC applications. Further, the typically used spacing between fins in the range of approximately 1 mm may represent a restriction in the effective air flow cross section which may produce air flow speeds and pressure drops which can be unsuitable for DAC applications. By increase the fin spacing of the secondary heat transfer structure to the above delimited range, the effective cross section area for airflow through the sorbent material layer can be increased, reducing the airflow speed and reducing the pressure drop over the sorbent material layer to levels which are feasible for DAC applications. This is can be an important requirement for some DAC applications.

Secondly, by incorporating fins as a secondary heat transfer structure in the frames, the thickness of the sorbent material layer can be increased because there is no heat transfer limitation in the vertical direction. In this fashion as long as the pressure drop through the sorbent material layer is maintained in an acceptable range, the sorbent material layer thickness can be increased thereby reducing the number of frames for a given stack height and the cost and thermal mass of the stack per unit sorbent material. The tubing diameter of the primary heat transfer structure can be thinner than the sorbent material layers as shown in FIG. 20. In this configuration, the tubing does not bind with the fabric layer and form a multitude of separated sorbent cells in each frame. The positive consequence is that the frames can be filled with sorbent material through one hole at one corner because the sorbent can pass around the tubes. To support such a filling concept, the vertical fins of the secondary heat transfer structure (10) can be perforated (see FIG. 20a) to allow sorbent material to pass between and through them. Thin perforated metal sheets are e.g. known from the production of perforated metal honeycomb structures. Such a design represents a further improvement over the above described planar secondary heat transfer structure placed in the middle of the frame which normally limits the maximum sorbent material layer thickness to about 10 mm. Further, the current design requires multiple sorbent material filling ports.

Thirdly, due to the spacing of the fins of the secondary heat transfer structure, the fabric material can be bonded with said fins over short distances which prevents bulging under the weight of the filled sorbent. The positive consequence is that the inlet and outlet channels have a better defined and more regular geometry. This is in contrast to other designs, where the fabric material can be at most bonded every 100 mm—a distance over which bulging under the weight of sorbent material essentially cannot be avoided, potentially blocking the inlet/outlet channel. Further structural stability can be gained by aligning the fins along the longer edge of the frame and bonding them with the fabric material. In this fashion the fins of the secondary heat transfer structure act as a core with cross struts, which transfers loads to the tensioned fabric material. This improves the stiffness and stability of the frame significantly.

The production technique of fin and tube heat exchangers can involve placing tubing into holes in the fins and locally expanding the tubing such that plastic deformation occurs in the tubing and the fin thereby affixing the fins on the tubes. Typically one fin spans several passes of tubing. This is realized by placing the fins on multiple straight tubing, expanding the tubing and connecting said tubing segments with welded or brazed elbow connectors. In this manner a strong mechanical and good thermal connection is realized in a multi-pass fin and tube heat exchanger. The process is already industrially automated and can be also adapted for DAC applications.

An alternative process for the making of structures to be used in DAC is described in the following and shown in FIG. 21. Groups of fins of the secondary heat transfer structure are fitted on the tube of the primary heat transfer structure as in the conventional production process with a spacing 'L' between groups (FIG. 21a). The conventional tubing expansion technique is applied to affix the fins on the tubing. Thereafter the tubes with the fitted fins can be bent into the form of the primary heat transfer structure desired in the conventional frame design (FIG. 21b). In the bent state, the fins are separated by a small gap which does not pose a significant penalty to heat transfer into the sorbent. Because the bends are free of fins, they can be placed into the frame profiles as per the current frame design. In this manner, the tube fin heat exchanger can be built from one continuous tube and require no welding or brazing processes.

Further, a thicker sorbent material layer requires thicker frame profiles which allow larger filling holes which speed up the filling of the sorbent material significantly. With 10 mm C-profile frames, the filling hole can be 6 mm and the resulting filling tube inner diameter can be 4 mm, which may represent a significant restriction to the flow of sorbent material during filling and a corresponding increase in sorbent material filling time. A 20 mm frame thickness could support the use of 16 mm filling holes with for example 14 mm inner diameters.

Moreover, the secondary heat transfer structure can consist of a granular material with good thermal conductivity that is mixed with the sorbent material.

The primary heat transfer structure, which can be contained in or be connected to the secondary heat exchange structure, can be tubing that can be flown through by a heat transfer fluid, for example water or a water/glycol mixture (FIG. 3, FIG. 4). The tubing can for example be a bended copper or aluminum pipe or a rubber or plastic hose. Through said heat transfer fluid the heat transfer structures can be rapidly heated up or cooled down by an external heating or cooling source, such as tanks of hot or cold heat transfer fluid.

Said heat transfer structures incorporated in the structure facilitates operating the unit of the present invention within a cyclic adsorption/desorption process comprising a thermal swing, since it allows for rapid heating and cooling of the particulate sorbent material between the individual steps of the adsorption/desorption cycle. The possibility to transfer heat from and to the heat transfer structures via a heat transfer fluid passing through said tubing provides an important interface to other processes or parts of a plant incorporating the unit of the present invention, since it allows incorporating various heating and cooling sources that are typically available in the form of a stream of hot or cold fluid.

Preferably, the heat transfer structures incorporated in the structure of the present invention are in good thermal contact with substantially all parts of the particulate sorbent material in the individual sorbent material layers so that the time for heating up and cooling down the sorbent material is kept to a minimum. Preferably, the heat transfer structures are built and incorporated into the structure of the present invention in a way that substantially all of the sorbent material can be heated up or cooled down by 75 K within a time of less than 60 minutes, more preferably within a time of less than 20 minutes.

If the primary heat exchange structure consists of tubing contained in each layer, the ends of the tubes can be connected to cylindrical elements contained in each frame structure. When stacking the layers, these cylindrical elements can be connected to each other, preferably using O-rings, forming backbone lines to transfer the heat transfer fluid to and from the tubes in the individual layers. Those backbone lines formed from individual cylindrical elements can have diameter in the range of 1 to 5 cm. Further, the tubing of the primary heat exchange structure as well as the secondary heat exchange structure can be directly included in the frame structures during the injection molding process. According to a further embodiment of the present invention, the primary heat transfer structure of each sorbent layer can be coupled with a feed and return distributor of heat transfer fluid which is itself connected to the heat transfer fluid feed and return lines. According to a further embodiment of the present invention, a heat transfer structure placed within the sorbent material layer forms parts of or the complete geometrical shape of the layers of the particulate sorbent material and/or serves as support for the two layers of flexible fabric material enclosing the layer of sorbent material. For example, the heat transfer structure can be made of corrugated expanded metal where the bottom and top peaks of the corrugations serve as mounting surfaces for the fabric material (FIG. 5). As another example, the heat transfer structure can be made of an aluminum honeycomb structure with the same thickness as the sorbent material. The two layers of fabric material can be attached to this honeycomb structure, for example by gluing or welding. An advantage of this embodiment is that the amount of material required to form the structure of the present invention is minimized, since the heat transfer structure fulfills two functions (heat transfer and support of the fabric layers) at the same time. This in turn results in a minimized thermal mass of the structure of this embodiment, resulting in reduced energy consumption for heating up the structure.

According to one embodiment of the present invention the sorbent material layers have a rectangular shape, for example a quadratic shape with 1 m edge length and 1 cm thickness, and the stack formed by the layers has a rectangular block shaped form, for example 1 m×1 m×1 m (FIG. 6).

According to another embodiment of the present invention the sorbent material layers have the shape of a disc with a center hole, for example with a diameter of the discs of 1.5 m and a diameter of the center hole of 0.6 m, and the stack formed by the layers has a cylindrical shape, for example of 1.5 m diameter and 2.5 m length (FIG. 7). In this embodiment, a gas inlet manifold is formed by the stacked center holes and a gas outlet manifold can have the form of an annulus located around the cylindrical stack.

According to yet another embodiment of the present invention the sorbent material layers have the shape of concentric annuluses and the stack formed by the layers has a cylindrical shape, for example of 1.5 m diameter and 2.5 m length (FIG. 8).

According to one embodiment of the present invention, the flexible fabric material layers enclosing the sorbent material layer perform at the same time the function of a particle filter holding back particles, e.g., dust particles, in the inlet gas stream from the sorbent material. This embodiment can be advantageous for applications in which filtering of the inlet gas stream would be necessary to protect the sorbent material, for example for the case CO2 adsorption from atmospheric air. In this embodiment, consequently, no additional filtering structure would be required. Due to the very high surface area of the fabric sheets and the relatively low flow velocity through them (see above), the pressure built-up on the sheets due to dust loading is relatively small.

According to one aspect of the present invention, the pressure drop of the gas flow through the gas inlet and outlet channels enclosed between the inlet faces and outlet faces of the sorbent material layers can be significantly smaller (preferably at least 5 times smaller, more preferably at least 10 times smaller) than the respective pressure drop of the gas flow through the sorbent material layers. The advantage of this aspect is a more uniformly distributed pressure gradient across the sorbent material layers and therefore more uniformly distributed flow through the sorbent material layer, which ensures most efficient utilization of the sorbent material during the adsorption process.

According to one embodiment of the present invention, at least some of the elements (e.g. stiffeners/rods) of a stiff frame structure supporting the two layers of fabric material which are located inside the sorbent layer have the shape of a H, C or Z-profile or a similar shape. This embodiment has the important advantage that by-pass flows by-passing the bulk layer of sorbent material, which are likely to occur at edges contained in the sorbent layer, can be reduced due to the fact that the path of a potential by-pass flow is significantly longer than it would be for the case of straight elements in the sorbent layer (FIG. 9).

According to one embodiment of the present invention, the sorbent material layers and their enclosing fabric material layers are built the way that the sorbent material can be filled into the layer through one or several holes, preferably at the edges of the sorbent material layer. Within this embodiment, the elements (e.g. stiffeners/rods) of a stiff frame structure supporting the two layers of fabric material which are located inside the sorbent layer and can potentially form individual cells within the sorbent material layer have one or several holes through which the particulate sorbent material, which preferably has good flowability properties, can pass between the cells during the filling process. Also, if the heat transfer structure is made from a honeycomb structure, the walls of the individual cells of the honeycomb structure can comprise holes to interconnect the cells and facilitate filling the structure with the particulate sorbent material.

According to one aspect of the present invention, a method of producing the sorbent material layers consists in filling the particulate sorbent material into the layer enclosed between the two layers of fabric material through one or several holes, preferably at the edges of the sorbent material layer, preferably by utilizing pressurized air for the filling process.

According to one embodiment of the present invention, an enclosure or cage enclosing the stack of the layers of sorbent material is supported by said stack to carry vacuum forces imposed on the container from the outside under certain process conditions.

According to one embodiment of the present invention, lids or valves opening and sealing the gas inlet side or the gas inlet manifold and the gas outlet side or the gas outlet manifold can be opened over at least 50%, preferably at least 75%, more preferably at least 90% of the frontal area of the stack (viewed in the direction of the gas flow).

One aspect of the present invention comprises a cyclic adsorption/desorption process to remove components from a gas stream that uses the unit described in the foregoing. In one preferred embodiment of the present invention, the unit is used for a process to remove CO2 from air using an amine-based sorbent material.

In a typical cyclic adsorption/desorption process using such a unit, the adsorption can take place at ambient conditions, e.g., in a temperature range of −30-40° C. and at 0.7 to 1.3 bar absolute pressure. After the adsorption of carbon dioxide or carbon dioxide and water vapor the sorbent material can be regenerated or desorbed by heating it up to e.g. 50-120° C. and reducing the partial pressure of CO2 around the sorbent material by reducing the absolute pressure to, e.g., 1-250 $mbar_{abs}$, i.e., apply a vacuum, and/or exposing the sorbent material to a purge gas flow. If the desorption is achieved by heating the sorbent and applying a vacuum, the overall cyclic process is referred to as temperature-vacuum swing (TVS) process. If the desorption is achieved by heating the sorbent and exposing it to a purge gas flow, the overall cyclic process is referred to as temperature-concentration swing (TCS) process.

In one preferred embodiment of the present invention, the structure is used for a TVS process removing CO2 from ambient air.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Example 1. Working Example of the Present Invention in the Form of a Rectangular Stack According to one working example, the structure is composed of rectangular layers of sorbent material stacked on top of each other to form a rectangular block shaped stack comprising inlet channels, outlet channels and the sorbent layers. In this example, the fabrication and assembly of this example is described to illustrate the applicability of this invention in the form of a useful product for CO2 extraction from ambient air.

Figure 10:
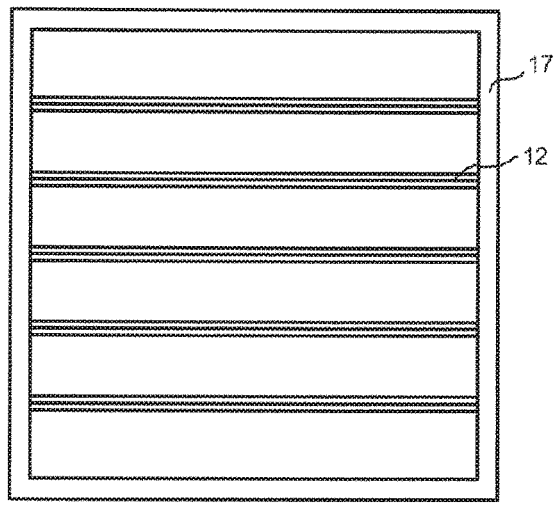
FIG. 10 shows a top view of a single sorbent material layer frame.

The individual sorbent material layers are formed by stiff frame structures, each comprising a rectangular frame with 0.5 m×0.6 m edge length and a height of 1 cm, made of stainless steel profiles. A top-view of such a single frame is shown in FIG. 10, a respective cross section in FIG. 11. The fabrication and assembly of the overall structure comprises the following steps:

1. The frame structures are fabricated by welding stainless steel profiles (e.g. for high-volume production, frame structures with the same functionality can for also be made by injection molding of a plastic material or aluminum, which can significantly reduce the production costs);
2. Into the frames aluminum wire mesh and a rubber tube containing a heat transfer fluid is inserted to ensure good heat transfer;
3. A layer of non-woven fabric material is glued on each side (top and bottom) of the frame structure using a two-component adhesive.
4. A sorbent material based on amine modified cellulose fibers is produced according to a scaled-up version of the procedure disclosed in WO2012168346A1:
    a. Isolation of cellulose nanofibers from refined fibrous beech wood pulp suspension (see "1. Isolation of cellulose nanofibers" in WO2012168346A1);
    b. Adding a solution of hydrolyzed 3-aminoproplymethyldiethoxysilane to a nanofiber suspension having a dry mass content of 3.2%;
    c. Homogenizing and stirring the solution for 2 h;
    d. Freezing the solution batch-wise in copper forms in liquid nitrogen;
    e. Freeze drying the frozen mixture for 48 hours;
    f. Treating the dried material at 120° C. in an oven under an argon atmosphere;
    g. Compressing and grating the material to obtain a granular sorbent material with average particles size of around 400 μm;
5. The sorbent material is filled into the frame structure through a hole which is closed afterwards;
6. A stable layer of sorbent material layer is obtained. The thickness varies between 1 and 1.5 cm;
7. In total, 26 frames are stacked on top of each other while distance pieces form the inlet and outlet channels;
8. The stack is mounted inside a rectangular vacuum chamber with internal dimensions of 0.55 m×0.55 m×0.65 m with an inlet and an outlet opening for the air flow;
9. A pneumatically actuated butterfly valve is connected to each of the openings to seal and open the chamber towards the environment;
10. The inlet opening is connected to a fan to produce the air flow during adsorption. Further, the chamber is connected to a vacuum pump to reduce the pressure during desorption and to a thermostat to heat and cool the stack during the individual cycle steps;

Within the stack of this example, a total surface area of the sorbent material layers toward the gas inlet channels of about 8 m² is accommodated. While the design air flow through the chamber is as high as 800 m³ per hour, the average velocity of the air flow through the sorbent layers is as little as 0.028 m/s. This ensures a very little pressure drop (see Example 2 below).

Figure 1:
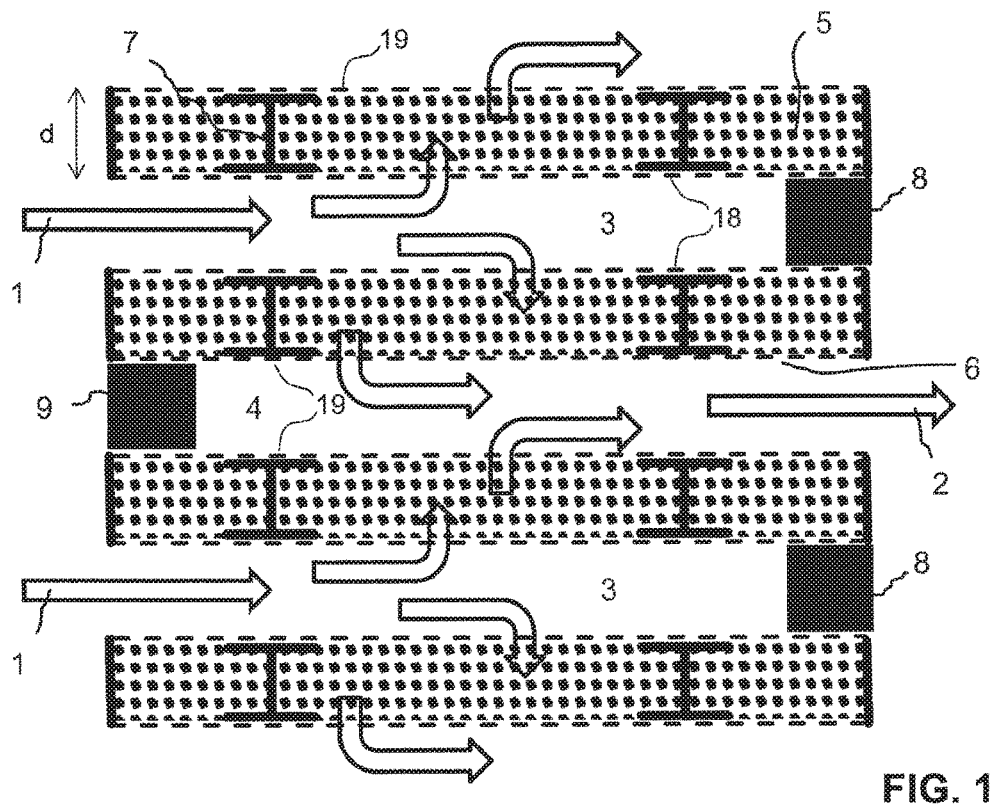
FIG. 1 shows a cross section of the principle geometrical structure of one preferred embodiment of the present invention including the layers of particulate sorbent material, each enclosed between two layers of a preferably flexible fabric material, arranged in the form of a stack to form gas inlet and outlet channels.
Figure 6:
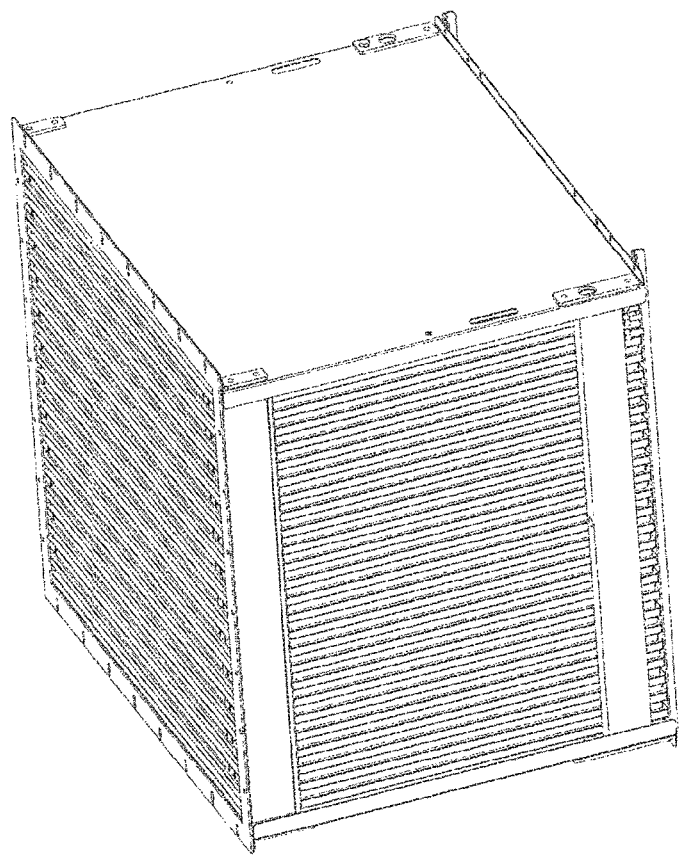
FIG. 6 shows a cross section of one embodiment of the present invention in which the sorbent material layers have a rectangular shape and the stack formed by the layers has a rectangular block shaped form.
Figure 7:
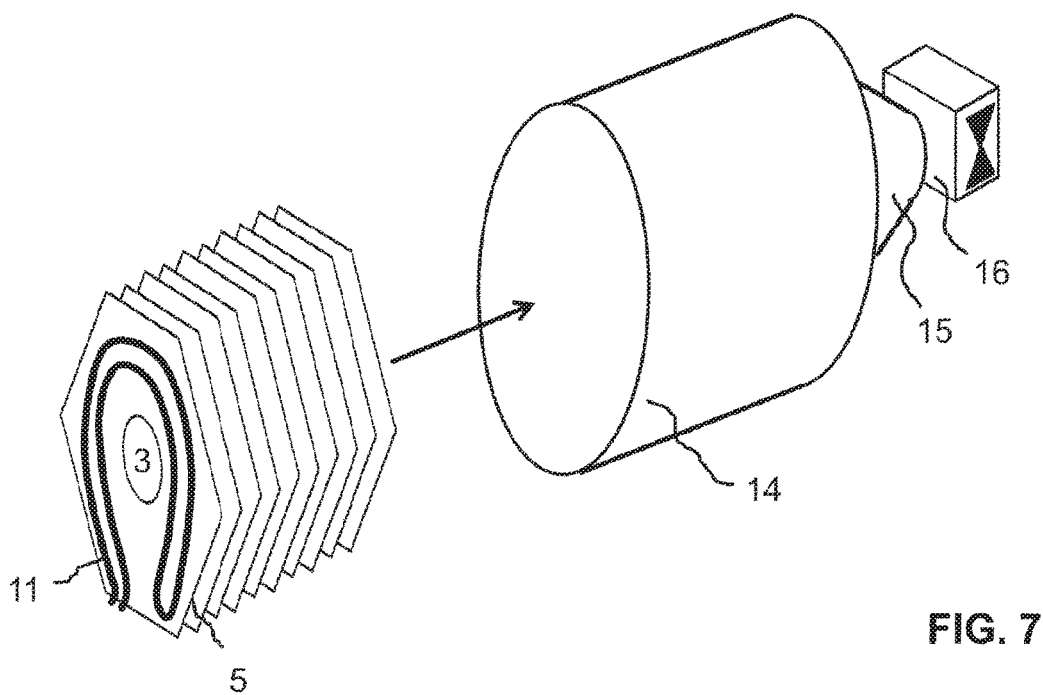
FIG. 7 shows an exploded view of one embodiment of the present invention in which the sorbent material layers have a hexagonal shape with a center hole and the stack formed by the layers is enclosed in a cylindrical container.
Figure 8:
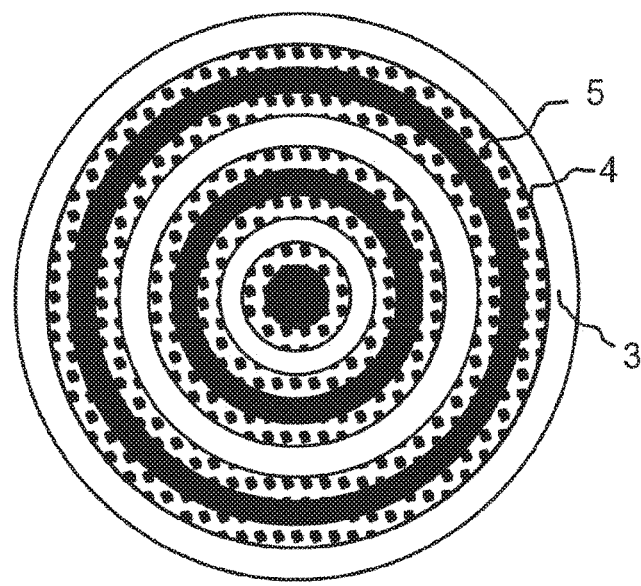
FIG. 8 shows a cross section of one embodiment of the present invention in which the sorbent material layers have the shape of concentric annuluses and the stack formed by the layers has a cylindrical shape.
Figure 9:
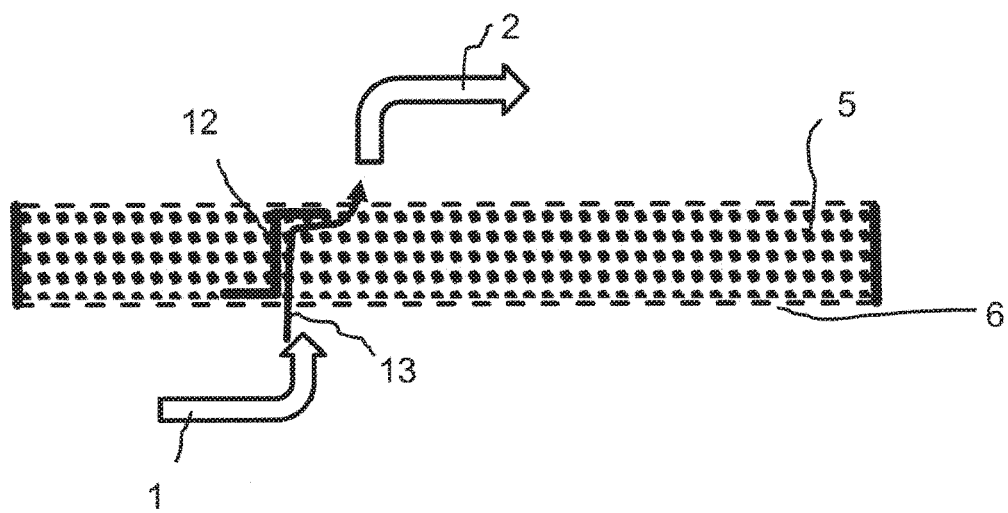
FIG. 9 shows a cross section of one sorbent material layer in which elements of a stiff frame structure located inside the sorbent layer have the shape of a Z-profile, elongating the path length of potential by-pass flows.
Figure 11:
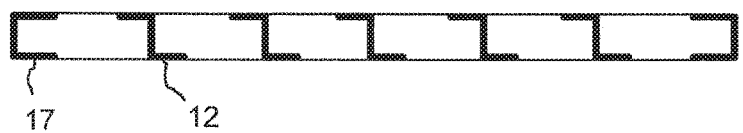
FIG. 11 shows a cross section of a single sorbent material layer frame.
Figure 12:
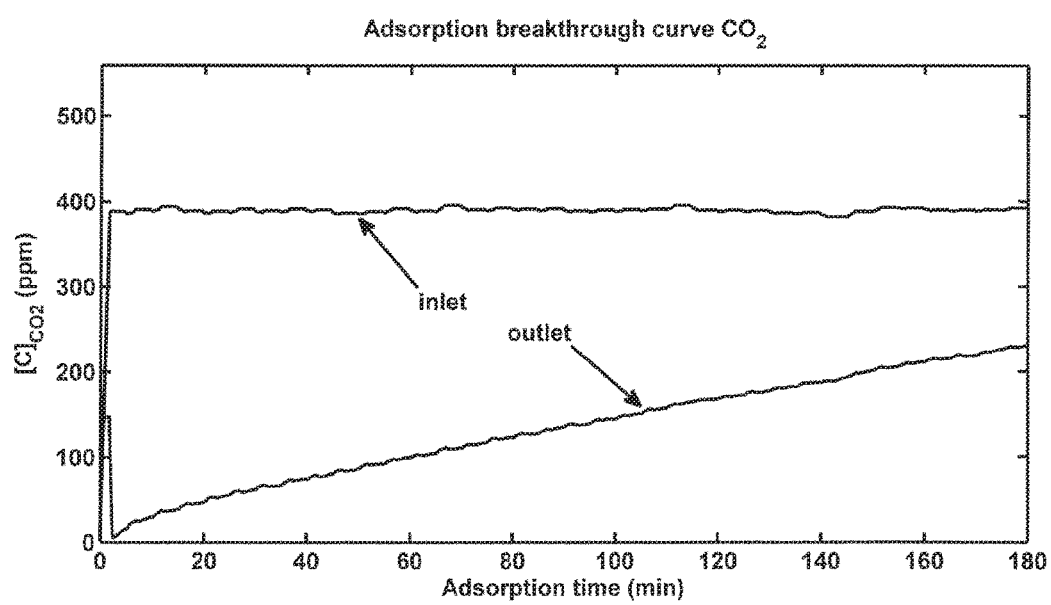
FIG. 12 shows the adsorption breakthrough curve of a specific embodiment of the present invention.

In FIG. 1, a principle schematic of the embodiment of this example is shown. In FIG. 6, a 3-D view of the stack comprising 26 sorbent material layers is shown. In FIG. 10, a top view of one of the frame structures composed of C-profiles 17 and Z-profiles 12 is shown. In FIG. 11, a cross section through the frame structure is shown.

Example 2. Determination of the Pressure Drop Through a Stack of Sorbent Layers

The pressure drop imposed on an air flow passing through a structure essentially fabricated according to the description of Example 1 is experimentally determined for different flow rates. To this end, both butterfly valves are opened and a variable speed fan is attached to the inlet opening producing different air flow rates through the stack. The flow rate is measured with an in-pipe velocity head meter and the pressure drop over the structure is measured using a differential pressure sensor. The observed pressure drop for various volume flow rates is shown in the following table:

| Volume flow (m³/h) | Pressure drop (Pa) |
| --- | --- |
| 200 | 16 |
| 400 | 31 |
| 600 | 58 |
| 800 | 98 |

It is found that up to the design flow rate of 800 m³/h, which is required to capture around 1 kg of CO2 from air per cycle (see Example 3), the pressure drop stays below 100 Pa. If the average pressure drop during the adsorption process is 100 Pa, the required pumping work to capture one ton of CO2 from atmospheric air is around 80 kWh (assuming that on average 70% of the CO2 is captured from the air stream and a fan efficiency of 70%). This energy consumption would correspond to electricity costs for air ventilation of US$ 8 per ton of CO2 (assuming an electricity price of US$ 0.1 per kWh), which is in an acceptable range. However, if the pressure drop was as high as 500 Pa, the corresponding electricity costs of US$ 40 for air ventilation would exceed the tolerable limits for an economic process.

This shows the important advantage of the structure of the present invention over conventional arrangements of particulate sorbent materials such as packed beds or fluidized beds, which are much longer than the sorbent packing of the present invention and which typically introduce pressure drops of several thousand Pascals up to several bars.

Example 3. Performance of Example 1 within a Cyclic Adsorption/Desorption Process A structure essentially fabricated according to the description of Example 1 is used for a cyclic temperature-vacuum swing adsorption/desorption process to extract CO2 from ambient air. One cycle of the process takes about 6 hours and comprises the steps adsorption (3 hours) and desorption (3 hours).

During the adsorption step, according to Example 2 above, the butterfly valves are opened and air is blown through the structure by a variable speed fan, while the flow rate is recorded. Further, the CO2 content of the air flow and its relative humidity are measured before and after the vacuum chamber using an infrared detector. The relative humidity during the adsorption process is relatively constant between 35% and 40%. The air flow is 750 to 800 m³/h. The CO2 concentration before and after the chamber ("adsorption breakthrough curves") during adsorption are shown in FIG. 10.

It is surprisingly found that initially, during the first minutes of the adsorption process, the CO2 concentration at the outlet of the chamber drops down to almost 0 ppm. This demonstrates the very good performance of the structure of this embodiment, since the vanishing CO2 concentration indicates that substantially all of the air flow passing through the structure effectively passes through the sorbent material layers and does not by-pass them. If there had been a substantial by-pass blow, this by-pass flow, which would still contain about 400 ppm CO2, would have mixed with the portion of the flow that passes through the sorbent material layer and would have increased the CO2 concentration at the chamber outlet.

This behavior of the system is substantially superior to the behavior that was observed in experiments with a short packed bed of the sorbent material of 1 cm length in a conventional, 4 cm diameter stainless steel column, in which the outlet CO2 concentration never reached values as low as observed in this example, presumably due to flow by-passing since the bed was not fixed between two layers of fabric and by-passing could occur along the column walls.

In particular, this demonstrates that the structure disclosed in the present invention allows creating embodiments based on 3-D structures and embodiments comprising different materials, which exhibit advantageous behavior during operation and which cannot be created from prior-art extruded 2-D structures.

Further, this example illustrates that with the proposed structure, extraction of a substantial portion of the CO2 contained in a stream of atmospheric air using a particulate amine-modified sorbent material is possible at a pressure drop below 100 Pa with a structure that can be manufactured with reasonable effort.

Figure 13:
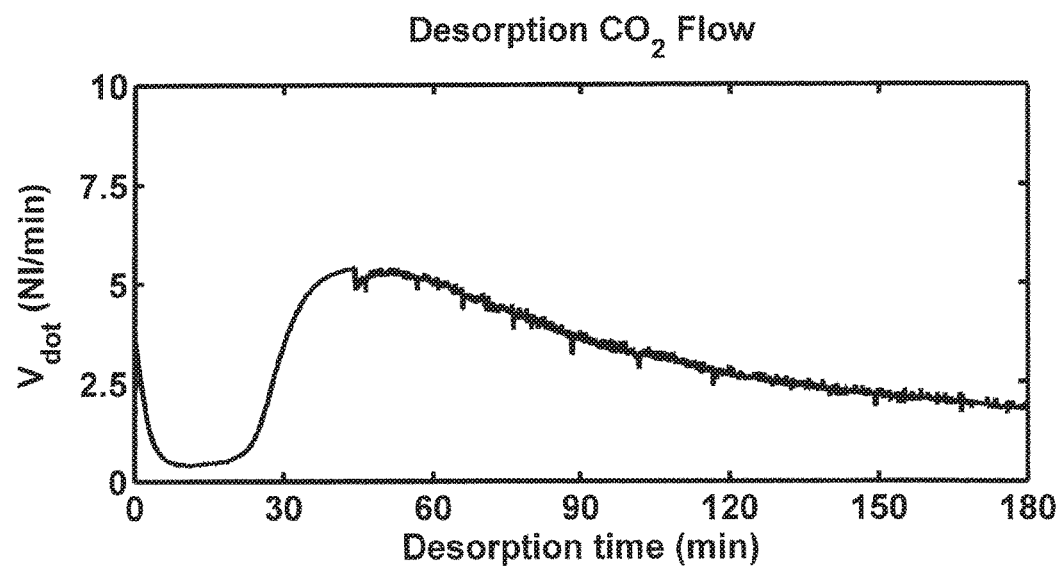
FIG. 13 shows the CO2 desorption flow during the desorption step of a process for extracting CO2 from atmospheric air.
Figure 14:
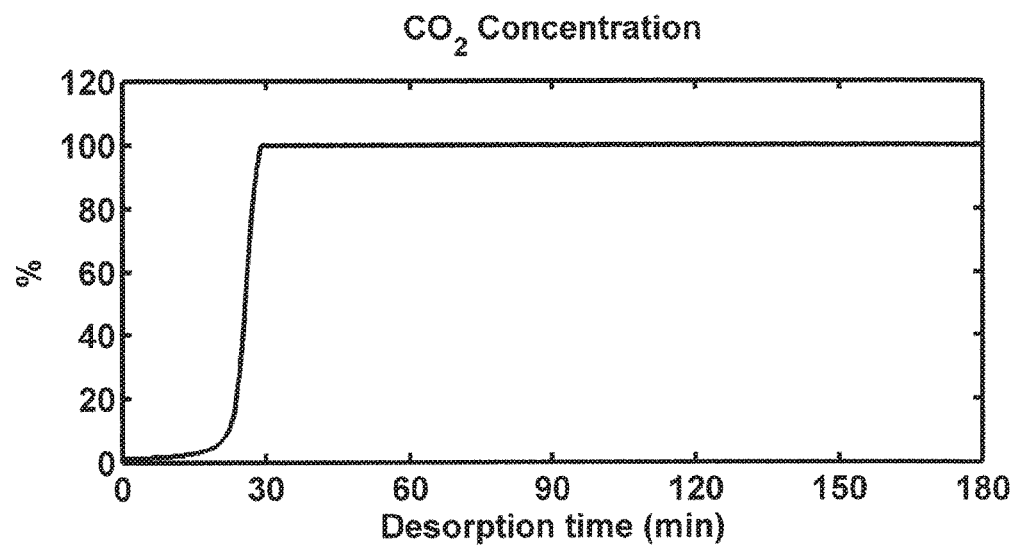
FIG. 14 shows the CO2 concentration in the desorption stream during the desorption step of a process for extracting CO2 from atmospheric air.

During the subsequent desorption step, the vacuum chamber is evacuated to about 100 mbar$_{abs}$ and the stack is subsequently heated up to about 85° C. by circulating hot water through the plastic tubes. Thereafter, the CO2 desorbing from the sorbent material is constantly pumped off the chamber by the vacuum pump. The mass flow rate of the CO2 leaving the vacuum pump is measured using a calorimetric mass flow meter, see FIG. 13. The CO2 concentration is also measured using an infrared sensor, see FIG. 14. It is observed that after the air that is initially still contained in the system is purged out, the CO2 concentration reaches the saturation limit of the sensor after about 30 min desorption time, indicating that the obtained CO2 concentration is at least >99%. During the complete desorption step, about 1 kg of CO2 are recovered. Thereby, this example further illustrates that the structure of the present invention was successfully applied to extract CO2 with a purity of >99% from atmospheric air.

Example 4. Example with Triangular Gas Inlet and Outlet Channels

Figure 2:
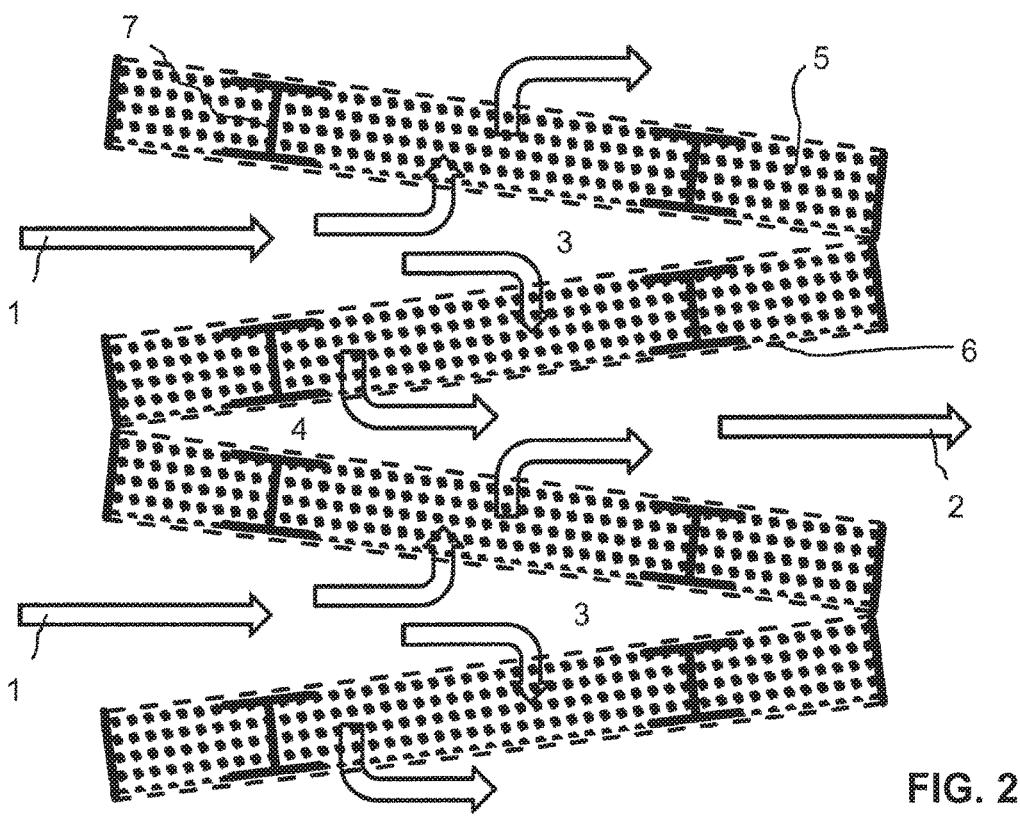
FIG. 2 shows a cross section of one embodiment of the present invention in which the layers of particulate sorbent material are arranged in a "zigzag" configuration.
Figure 3:
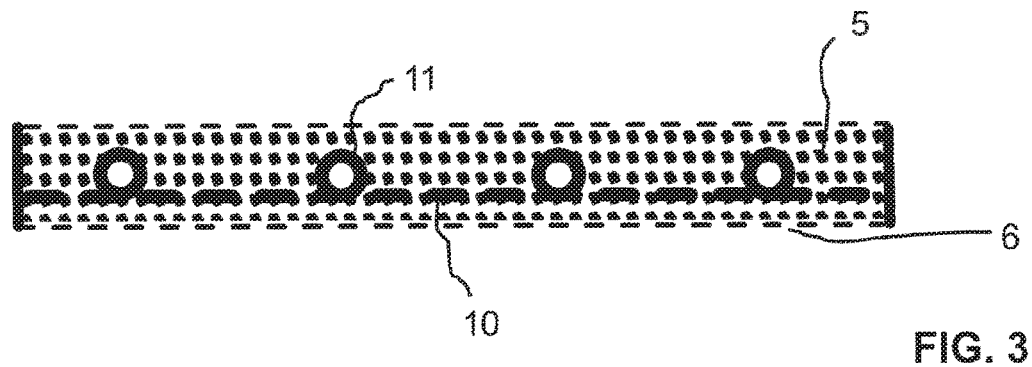
FIG. 3 shows a cross section of a heat transfer structure placed within the sorbent material layer connected to tubing that can be flown through by a heat transfer fluid.
Figure 4:
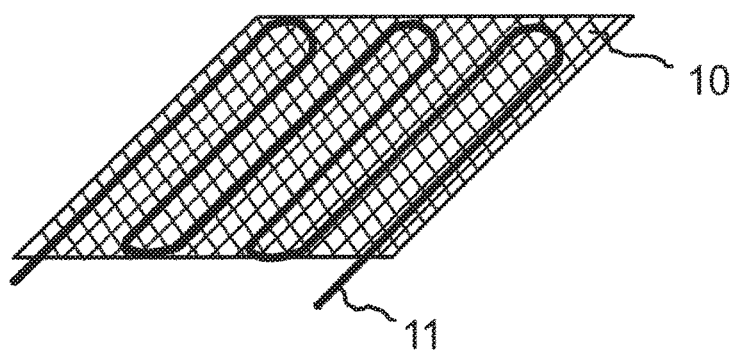
FIG. 4 shows a 3-D view of one embodiment of a heat transfer structure in the form of a sheet of expanded metal connected to tubing that can be flown through by a heat transfer fluid.

Another structure is fabricated, in which the gas inlet and outlet channels between the sorbent material layers have a triangular cross section. To this end, 20 frame structures each defining a 2 cm thick sorbent material layer are produced by injection molding of a thermoplastic material. During the injection molding process, a heat transfer structure composed of an aluminum tube and an aluminum honeycomb structure with a cell width of ½ inch, in which four of six side walls of each cell contain a center hole of 4 mm diameter, is integrated within the frame structure. Each frame further comprises triangular edges on its top defining the distance between two stacked frames and thereby the shape of the gas inlet and outlet channels. After the molding process, a woven fabric material made from a mixture of PET and PE fibers is glued on both sides of the frame and the frame is filled with sorbent material analog to the filling process described in Example 1. During the filling process, the sorbent material passes through the network of the cells of the aluminum honeycomb structure via the holes in the side walls of the honeycomb cells. The 20 frame structures are thereupon stacked on top of each other to form a stack with a cross section as schematically shown in FIG. 2.

Example 5. Utilization for a Flue Gas CO2 Capture Process

A stack of sorbent material layers contained in a vacuum chamber similar to the stack described in Example 1 is used to capture the CO2 contained in the flue gas stream of a natural gas powered combined heat and power internal combustion engine.

In this case, the CO2 concentration in the gas stream passing through the structure is approximately 6%. The gas volume flow during adsorption is substantially lower, i.e., in the range of 20 to 30 m$^3$/h. The adsorption process takes 0.5 h, on average 90% of the CO2 contained in the gas stream are extracted.

The desorption process takes 1 h, during which the CO2 is removed from the sorbent material by heating it to 95° C. Three of the units (one unit composed of one stack contained in a vacuum chamber) are operated in tandem operation, so that at each time, one stack is in adsorption mode and two stacks are in desorption mode and CO2 can be continuously captured from the flue gas stream.

Example 6. Effect of Heat Exchange Structure Placed Inside the Sorbent Material In order to demonstrate the effectiveness of a heat transfer structure incorporated within the sorbent material layer in an experiment, a packed bed of 100 g of sorbent material (see Example 1) is placed in a rectangular packed bed aluminum reactor with a cross section of 60 mm×60 mm. After 3 hours of adsorption during which 20 l/min of air at 60% relative humidity are streamed through the reactor, the sample is desorbed by evacuating the reactor to 100 r mbar$_{abs}$ by a vacuum pump and heating the reactor walls through a water-filled jacked to 90° C. The temperature in the center of the bed is recorded during the desorption process. For this experiment, it takes 221 minutes to reach a temperature of 80° C. in the bed center.

Subsequently, the experiment is repeated with 6 g of a ¾ inch cell width aluminum honeycomb structure placed in the sorbent material bed to increase heat transfer. For this experiment, it takes 79 minutes to reach a temperature of 80° C. in the bed center.

These observation demonstrates the effectiveness of a heat transfer structure included in the sorbent material bed, resulting in significantly shorter times to heat up the sorbent material bed during the desorption step, which in turn reduces the overall cycle time and thereby the overall cost of the adsorption process.

This example further illustrates another advantage of the structure disclosed in the present invention over prior art structures, since 3-D structures increasing the heat transfer included within the sorbent material layers, such as an aluminum honeycomb, cannot be easily incorporated into prior art, extruded 2-D structures.

Example 7. Example in the Form of a Rectangular Stack, Describing the Possible Dimensions of Frames and Stack and Stack Assembly Considering the requirements on pressure drop, an inlet and outlet channel length of 1 m was defined with a maximum sorbent material layer thickness of 1 cm and an inlet channel height of 1 cm. For constructive reason the vacuum chamber in which the adsorber structure is housed was defined to contain between 500 and 1000 kg of sorbent material. The resulting width of the frames was found to be 1.45 m. The frames are stacked on one another in the 'zig-zag' fashion with an angle of 2° between planar surface. In this fashion, the dead volume (i.e. volume of the stack not occupied by sorbent material) is decreased by 40% compared to a stack with parallel channels and the same inlet channel height. The reduction of dead volume increases the cost efficiency and process efficiency by packing more sorbent material into a given volume and thereby producing more CO2 from a given facility. The resulting stack height is 1.47 m with 88 sorbent material frames.

Figure 15:
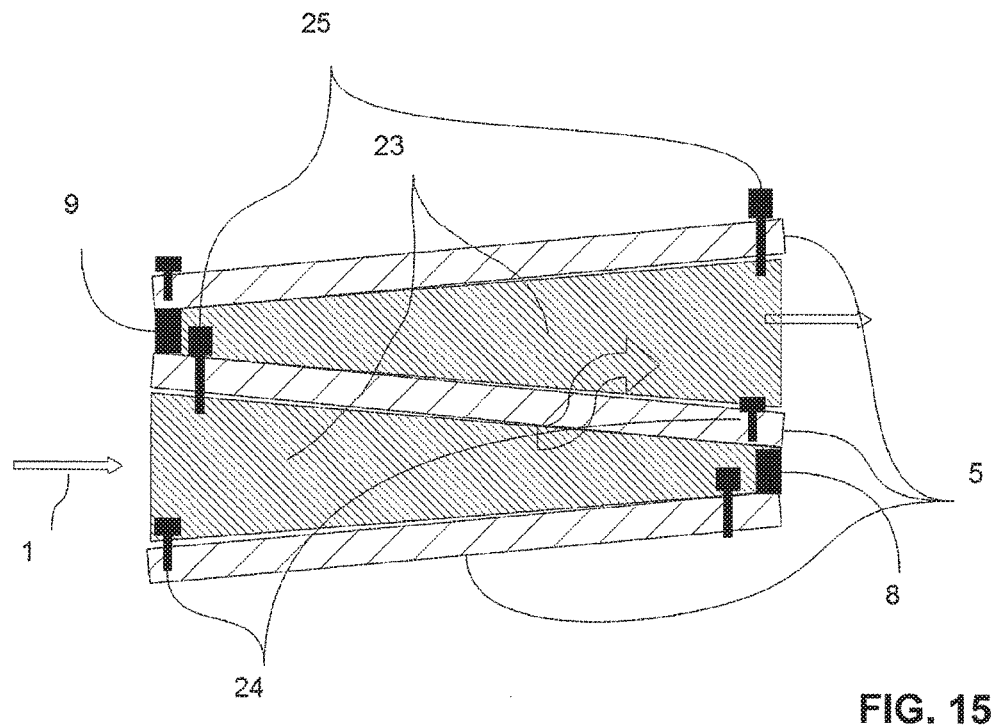
FIG. 15 shows the example of the 'zig-zag' stack viewed perpendicular to the air flow direction showing mounting screws, wedges and sealing components.

In FIG. 15, the frames 5 are shown being separated by wedge formed spacers 23, which are glued to the frames along the 1 m edges. These wedge spacers serve to produce the angle of the channels and seal the channels on the sides. Each wedge spacer is oriented on the head of a screw 24 affixed to the frame at the thick end. Each spacer is also affixed to the neighboring frame with screws 25 passing through the neighboring frame and attaching into the next lower wedge spacer. The wedge spacers are glued on the frames with double sided tape to provide a homogenous bond. The sealing strips 8, 9 seal off the channels and form thus the inlet and outlet channels respectively through which the airflow 1 must pass. This assembly solution allows for high modularity and adaptability of the stack in contrast to extracted monoliths or welded structures used in the prior art. Single or groups of frames can be added, removed or replaced economically and without affecting the performance of the stack as a whole.

Figure 16:
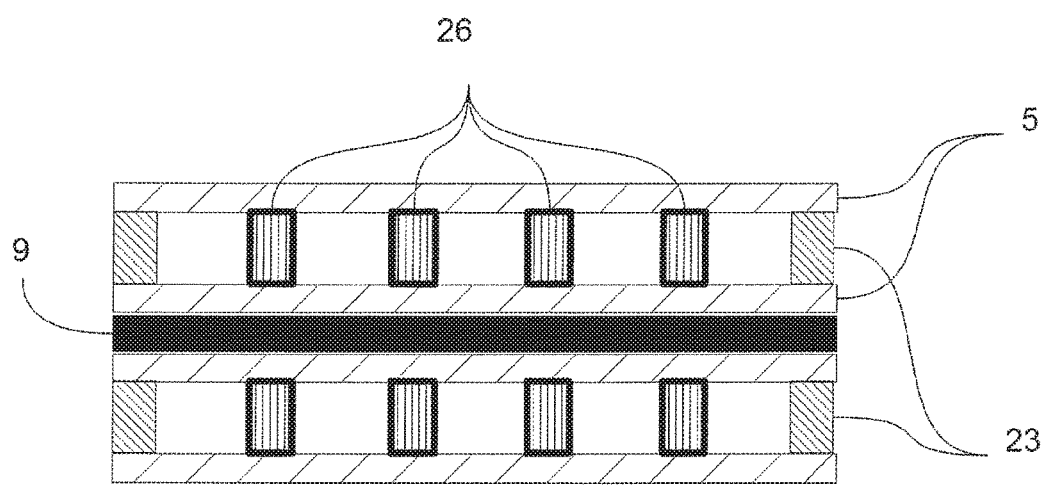
FIG. 16 shows the stack viewed parallel to the air flow direction with wedges between frames to maintain channel geometry under load.

In FIG. 16 the stack is shown from the orientation of the inlet channel. The wedges 26 placed on the primary heat transfer structure, also support the inlet channel profiles to prevent sagging and maintain the desired width of the inlet channel. In order to assure a consistent height of the stack of 88 frames the overall height of each stacked component needs to be within acceptable tolerances. Additionally, the bonds between the fabric material and frames and the wedges and sealing strips need to be consistent and homogenous. For example, a 0.5 mm tolerance on the thickness of a glue bead on each frame produces a total shift in the position and height of the 88 frame stack of 4.4 cm which jeopardizes the connection with the heat transfer fluid system as described in Example 10. To this end, double sided tape with 0.22 mm thickness is used. The tape offers consistent bond thickness and strength, can withstand the temperatures imposed by the desorption process of up to 120° C., facilitates repairs and overhauls and shortens assembly time compared to glue.

The same principle of the stack layout and assembly described in this example can be applied to various other stack geometries, for example, but not limited to smaller stacks consisting of less frames, different frame dimensions, and a non-angular stacking layout, i.e. a stack in which the frames are essentially parallel to each other with no angle between the surfaces, i.e. no 'zig-zag' structure.

Example 8. Low Thermal Mass Frames

A reduction of the thermal mass of the frames per mass of contained sorbent material reduces the overall energy demand of the desorption process and is a critical parameter in the design of DAC systems. As the desorption process takes place in a vacuum structure which carries the vacuum forces, the frames themselves must only carry their own weight, the weight of the sorbent material, the weight of the heat transfer structures, and assure the desired geometry of the inlet and outlet channels and the sealing faces. An example of such a frame was constructed with four aluminum C profiles with 10×10 mm outer dimensions and 8×8 mm inner dimensions, connected with edge brackets to form the rectangular form. The primary heat transfer structure is formed by 10 passes of 8 mm OD alumium tubing which is placed into the C profiles and which pass at two places thorugh the C profiles to allow connection with water distributors. In this manner, the stability of the primary heat transfer structure is assured without additional frame components. The aluminum tubes (primary heat transfer structure) thereby make up a significant contribution to the overall stiffness of the frame. The secondary heat transfer structure is formed of expanded aluminum sheet metal, which is formed to the primary heat transfer structure as in FIG. 5 and glued in place. The fabric material is bonded between the C profiles at the edges of the frame forming the closed, air permeable volume in which the sorbent material can be filled. In order to prevent bulging when filled with sorbent material, the fabric material is tensioned and glued to the tubing of the primary heat transfer structure and the edge profiles of the frame. Thereby cells are formed with dimensions of 1 m×0.1 m in which the sorbent material is filled. Each cell is equipped with a sealable hole in the C profile at one corner to allow sorbent to be filled.

Decisive in the feasibility of a frame design is the thermal mass of the components which must be thermally cycled during the cyclic adsorption-desorption process. The contributions of each element and the total thermal mass of the frame per unit mass of contained sorbent material are detailed in the following table. The contained sorbent mass is 7.25 kg

| Frame component | Mass (kg) | Material | Specific Thermal Mass (kJ/K/kg sorbent) |
|---|---|---|---|
| C Profiles & Struts | 0.37 | Aluminum (Profiles) | 0.046 |
| Wedge spacers and sealing strips | 0.158 | Ultramide (PA) | 0.037 |
| Primary heat transfer structure | 1.07 | Aluminum (Tubing) | 0.132 |
| Secondary heat transfer structure | 1.31 | Aluminum (Expanded metal) | 0.162 |
| Total | 2.908 | | 0.377 |

An example sorbent suitable for CO2 capture from ambient air has a specific heat capacity of 1.4 kJ/K/kg sorbent with a specific heat of desorption of CO2 and water of 211 kJ/kg sorbent material. In a typical desorption process the sorbent material must be heated from the adsorption temperature of 20° C. to 100° C. The total thermal energy demand in this typical desorption process can be determined to be 323 kJ/kg sorbent material. The thermal energy demand of the frames in this scenario is 30.2 kJ/kg sorbent material or 9.3% of the total thermal energy demand.

Example 9. Heat Transfer Structure and its Dimensioning

Figure 17:
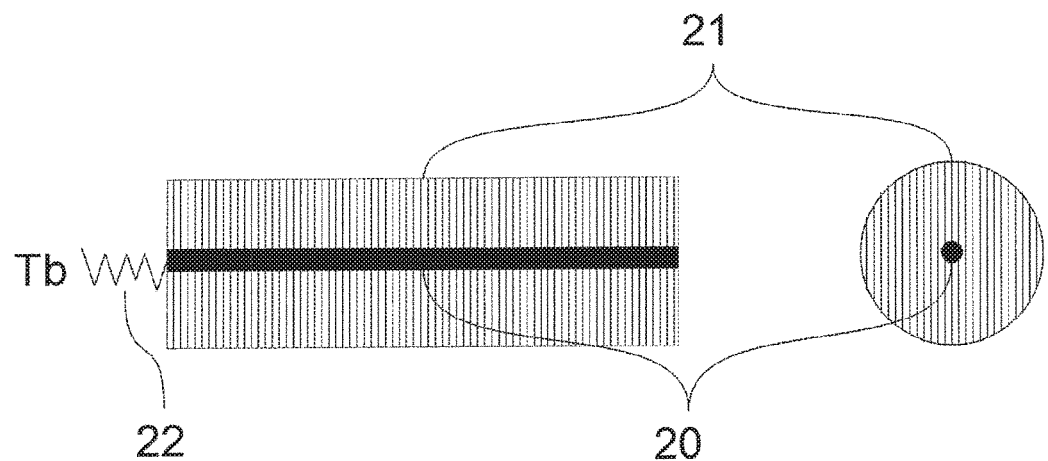
FIG. 17 shows schematically the thermal model used for dimensioning the primary and secondary heat transfer structures.

Heat transfer through a representative unit cell of a secondary heat transfer structure and sorbent material was investigated with numerical simulations. A representative unit cell composed of a heat transfer structure concentric with a sorbent cell was investigated as shown in FIG. 17. A temperature boundary condition was applied at one end of the heat transfer structure separated from the unit cell by a thermal resistance representing the connection between the primary and secondary heat transfer structures. Various effects of the thermal connection, material and geometry were investigated. Of common engineering materials, aluminum was determined to be the most favorable for the chosen parameters due to its high thermal conductivity, low density and corrosion resistance. For the desired sorbent material and the desired duration of the desorption process, it was found that a cell with 50 mm length and 10 mm sorbent cell diameter can be heated sufficiently with a secondary heat transfer structure of 1.7 mm diameter. Such geometry yields a specific weight of heat transfer structure of 0.2 kg/kg sorbent material which is more than the 0.06 kg/kg sorbent material described in Example 6. These structures offer a high thermal conductivity in the planar directions, are easily formable, and allow for effective bonding with the primary heat transfer structure.

The 50 mm unit cell length translates into the spacing of the primary heat transfer structure in the form of bent alumium tubing. Over the 1.5 m width of the frames, there are therefore 10 passes of aluminum tubing. This solution represents a good compromise between the density of heating, structural stability, material demand and thermal mass of the frames.

Figure 5:
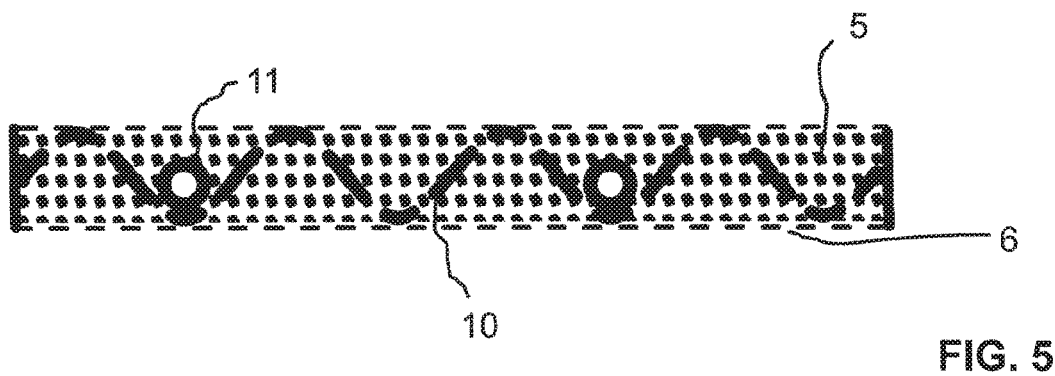
FIG. 5 shows a heat transfer structure of a corrugated shape, placed within the sorbent material layer, where the bottom and top peaks of the corrugations serve as mounting surfaces for the fabric material enclosing the sorbent material.
Figure 19:
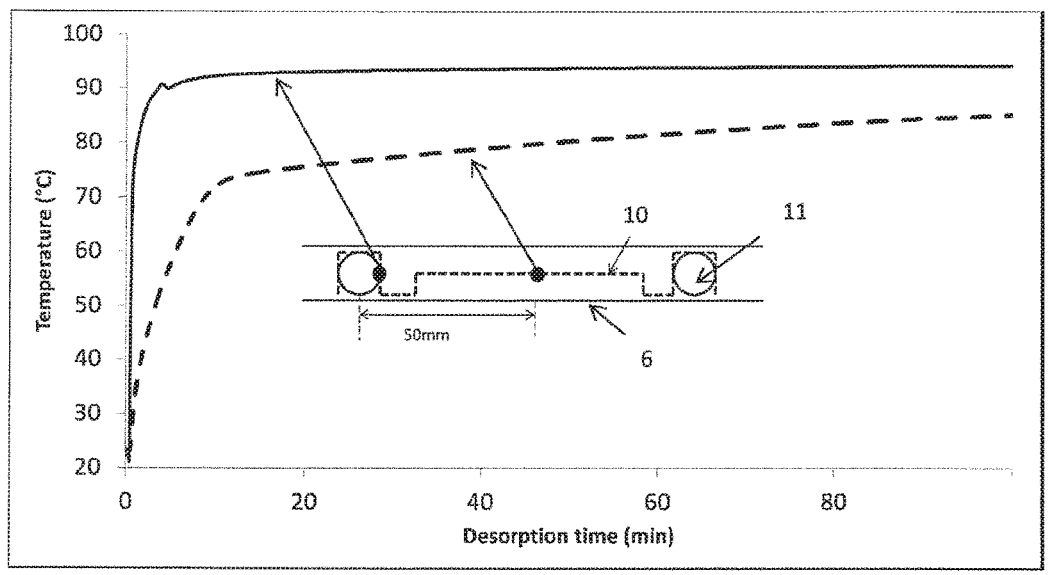
FIG. 19 shows the temperature profiles of primary and expanded metal secondary heat transfer structures in a desorption process.
Figure 20:
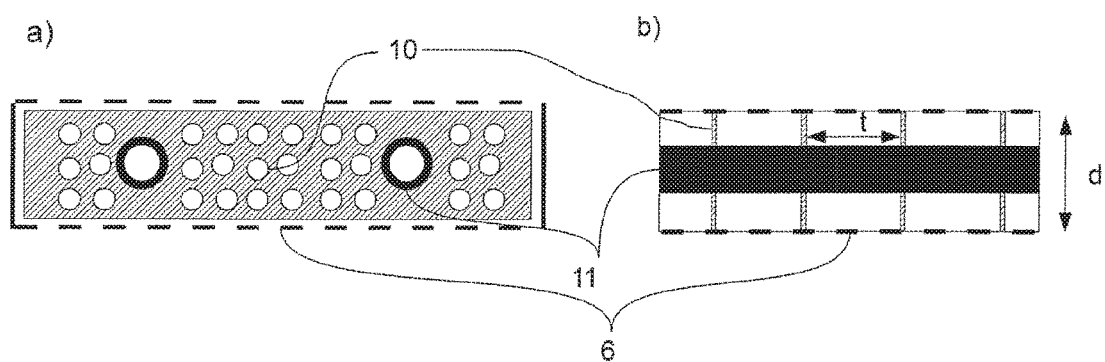
FIG. 20 heat transfer structure with fins for improved heat transfer, wherein in a) a view along the tubing of the primary exchange system and in b) the lateral view along the fin.
Figure 21:
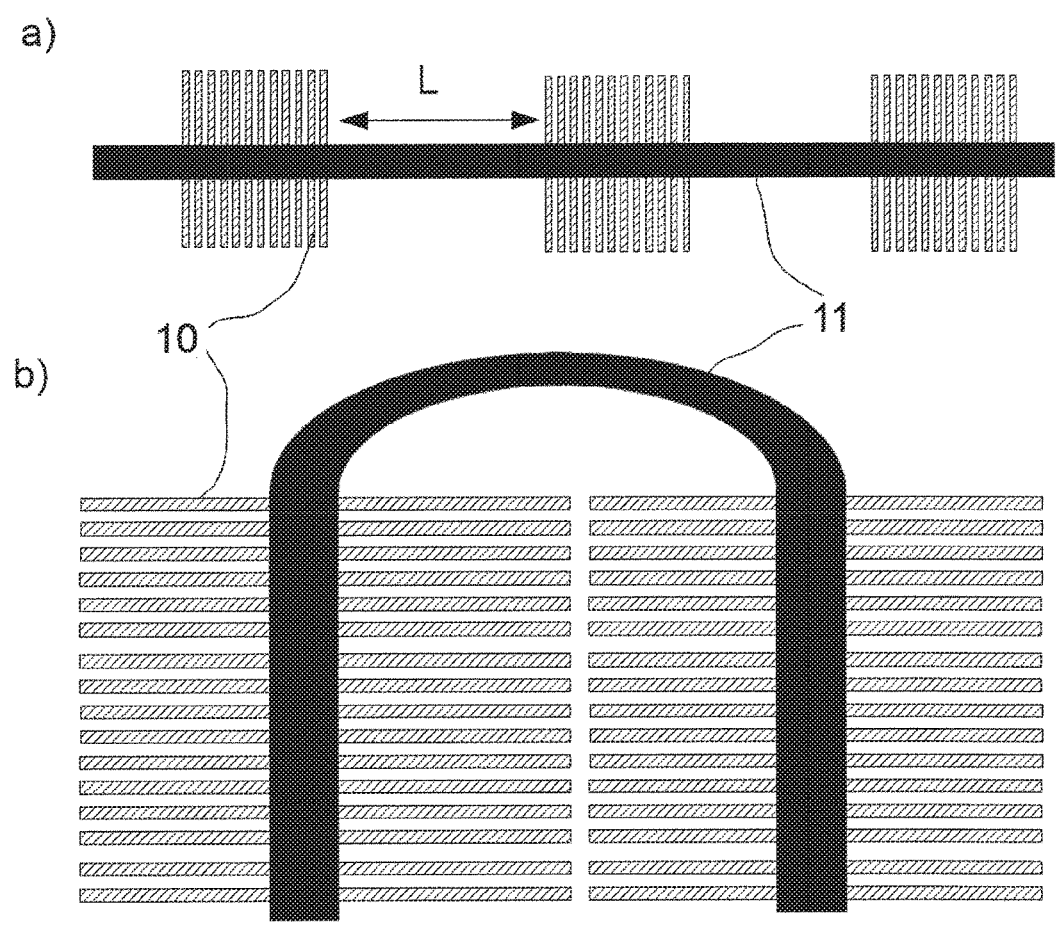
FIG. 21 production process illustration, wherein in a) the structure before bending as illustrated and in b) the final bent structure.

The selected aluminum expanded metal of the secondary heat transfer structure is firstly formed around the primary heat transfer structure to increase the contact area consistent with the form shown in FIG. 5. Further, the secondary heat transfer structure can be bonded with the primary structure with high thermal conductivity glues, or aluminum brazing. Shown in FIG. 19, are the temperature curves for a desorption process in a frame equipped with an expanded metal secondary heat transfer structure soldered to the tubing of the primary heat transfer structure. In this example a relatively low heat transfer fluid feed temperature of 93.6° C. flowed in the primary heat transfer structure. The temperature profiles of the surface of the tubing and at the middle of the expanded metal between the tubing show that within the desorption time of 90 minutes, the sorbent achieves a temperature of 85° C.

Example 10. Connection with Process Equipment

Figure 18:
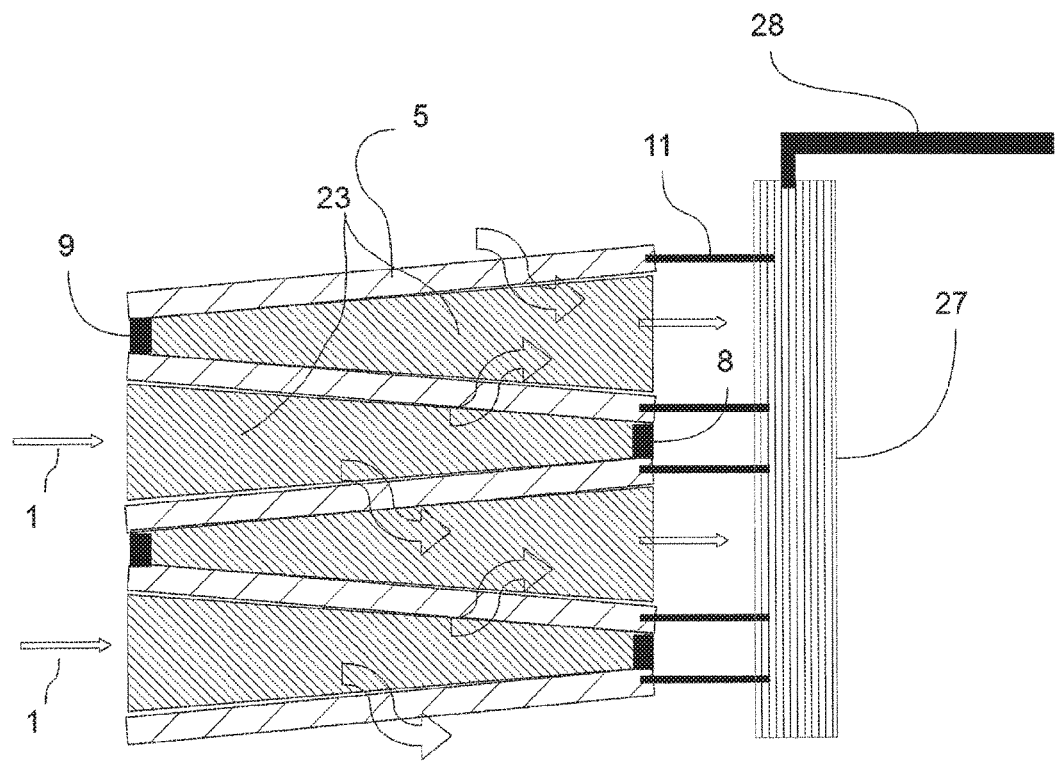
FIG. 18 shows the integration of the heat transfer fluid distributor at the return line into the 'zig-zag' stack.

The stack is to be connected with a heat transfer fluid system. This is accomplished with a heat transfer fluid distributor which engages into the primary heat transfer structure at each frame as shown in FIG. 18. By using a heat transfer fluid distributor with a larger flow cross section than the flow cross section of the primary heat transfer structure, the frames are set hydraulically in parallel and therefore see the same inlet temperatures and heat transfer fluid flow rates, which assures homogenous heating and cooling behavior. Because the heat transfer fluid distributor must engage with the free ends of the tubing of the primary heat transfer structure, the vertical position of individual frames must be well controlled. This is supported by using double sided tape with tight thickness tolerances for bonding frame components as was described in Example 7. The heat transfer fluid distributor is made of aluminum in order to avoid corrosion when combined with the aluminum primary heat transfer structure. The heat transfer fluid supply line of the frame inlet distributor is placed at the lowest point and, the heat transfer fluid return line of the frame outlet distributor is placed at the highest point. In this fashion the system can be effectively purged of air.

Example 11. Thermal Mass of Frames Using Fin and Tube Heat Transfer Structure in a DAC Application The thermal masses of a possible fin and tube heat transfer structure in a frame are determined for a 20 mm thick sorbent material layer. This is compared with a conventional frame construction with 10 mm sorbent material layer thickness. As a reference the mass and thermal mass of a 10 mm frame with planar expanded aluminum metal heat transfer structure according to the current design is calculated in the following table.

| Frame component | Mass (kg) | Material | Specific Thermal Mass (kJ/K/kg Sorbent) |
| --- | --- | --- | --- |
| C Profiles & Struts | 0.37 | Aluminum (Profiles) | 0.046 |
| Wedge spacers and sealing strips | 0.158 | Ultramide (PA) | 0.037 |
| Primary HEX | 1.07 | Aluminum (Tubing) | 0.132 |
| Secondary HEX (fins) | 1.31 | Aluminum (Expanded metal) | 0.162 |
| Frame Mass | 2.908 | | 0.377 |
| Sorbent mass | 7.25 | | |
| Ratio (kg Frame/kg Sorbent) | 0.411 | | |

A 20 mm frame with fin secondary heat transfer structure will have a doubled mass for the frame C profiles due to the doubled height. The wedge spacers 23, 26 and sealing strips 9, 8 remain the same (although their overall quantity in the stack is reduced), the primary heat exchanger structure retains the same mass as the length and diameter of the tube 11 are retained. The secondary heat transfer structure sees the main change. The results are shown in the following table for a frame with a 20 mm thick sorbent material layer with 14.1 kg sorbent material.

The following assumptions are made:
Frame width=1.5 m with 1 mm profile thickness
Frame length=1.0 m with 1 mm profile thickness
Primary HEX volume (as in a 10 mm sorbent layer)= 3.964e-4 m3
Secondary HEX 100 fins with 10 mm spacing aligned with 1.5 m edge, 20 mm high, 0.5 mm thick with 50% of surface area perforated=7.5e-4 m3
Mass secondary HEX=7.5e-4 m3×2700 kg/m3=2.025 kg
Total volume for sorbent in frame=0.0282 m3
Sorbent material mass=sorbent density (500 kg/m3)*total volume=14.1 kg

| Frame component | Mass (kg) | Material | Specific Thermal Mass (kJ/K/kg Sorbent) |
| --- | --- | --- | --- |
| C Profiles & Struts | 0.74 | Aluminum (Profiles) | 0.047 |
| Wedge spacers and sealing strips | 0.158 | Ultramide (PA) | 0.019 |
| Primary HEX | 1.07 | Aluminum (Tubing) | 0.068 |
| Secondary HEX (fins) | 2.025 | Aluminum (Expanded metal) | 0.129 |
| Frame Mass | 3.993 | | 0.263 |
| Sorbent mass | 14.1 | | |
| Ratio (kg Frame/kg Sorbent) | 0.283 | | |

It is seen through this example that a fin and tube heat transfer structure which allows an increase in the sorbent material layer to 20 mm lowers the thermal mass per unit sorbent material of each frame by 30%. The gain is mainly seen because the primary heat transfer structure and the wedge spacers and sealing strips do not scale with the sorbent material layer thickness.

LIST OF REFERENCE SIGNS

1 Inlet gas stream, gas inflow, main gas inflow direction
2 Outlet gas stream, gas outflow, main gas outflow direction
3 Gas inlet channel
4 Gas outlet channel
5 Particulate sorbent material layer
6 Sheet of fabric material enclosing the sorbent material
7 Part of a frame, defining the geometrical structure of a sorbent layer and supporting the fabric material enclosing the sorbent material
8 Structure blocking the end of a gas inlet channel
9 Structure blocking the beginning of a gas outlet channel
10 Secondary heat transfer structure inside the sorbent material layer
11 Tube containing a heat transfer fluid, being part of the primary heat transfer structure inside the sorbent material layer
12 Z-profile being part of the frame defining the geometrical structure of a sorbent layer
13 Path of a by-pass gas flow along the edge of the packed bed of sorbent material inside the sorbent material layer
14 Container, enclosing the stack of the layers of sorbent material
15 Gas outlet manifold
16 Valve/lid opening and sealing the outlet manifold with respect to the environment
17 C-profile being part of the frame defining the geometrical structure of a sorbent layer
18 inlet face
19 outlet face
20 heat transfer structure in thermal model 21 sorbent material in thermal model
22 thermal contact resistance in thermal model
23 wedge formed spacers at edges
24 mounting screw
25 mounting and orienting screw
26 wedge formed spacers on
27 heat transfer fluid distributor
28 heat transfer fluid return line
d  distance between 18 and 19
Tb temperature boundary in thermal model
L  distance between fin groups

The invention claimed is:

1. A gas separation unit for the separation of a first gas from a gas mixture containing said first gas as well as further gases different from the first gas by using a cyclic adsorption/desorption process using a loose particulate sorbent material for gas adsorption,
   wherein said particulate sorbent material is arranged in at least two stacked layers,
   wherein each layer comprises two sheets of a flexible fabric material which is gas permeable but impermeable to the loose particulate sorbent material, which sheets:
   are either mounted on a stiff frame structure or form the layer in a self-supporting way using spacers or distance elements between them,
   are arranged essentially parallel defining an inlet face of the layer and an outlet face of the layer,
   are arranged with a distance between the sheets in the range of 0.5-2.5 cm, and
   are enclosing a cavity in which the particulate sorbent material is located,
   wherein the unit has a gas inlet side or gas inlet manifold through which a gas inflow of the gas mixture enters the unit and a gas outlet side or gas outlet manifold through which a gas outflow exits the unit, a gas pathway between the gas inflow and the gas outflow being confined in the unit to pass through at least one layer;
   wherein said layers are arranged in the unit such that the gas inflow passes through the inlet face, subsequently through the particulate sorbent material located in the cavity of the respective layer, subsequently to exit the respective layer through the outlet face to form the gas outflow;
   wherein the layers are arranged such that inlet faces of adjacent layers are facing each other enclosing gas inlet channels and such that outlet faces are facing each other enclosing gas outlet channels;
   wherein a mean distance between inlet faces and/or outlet faces defining said channels, measured in a direction essentially perpendicular to a main gas inflow direction and a main gas outflow direction, respectively, is in the range of 0.5-5 cm;
   wherein a length of the inlet face and/or of the outlet face in a direction parallel to the main gas inflow direction and the main gas outflow direction, respectively, is at least ten times larger than distance (d) between the sheets in the layer;
   wherein at least one layer is provided with primary heat exchange elements,
   wherein tubing is provided in each layer,
   wherein there are provided stackable backbone elements,
   wherein attachment means are provided in or at said stackable backbone elements for fluid transfer attachment of ends of the tubes, and
   wherein the stackable backbone elements can be connected to each other, to transfer a heat transfer fluid to and from the tubes in individual layers.

2. The gas separation unit according to claim 1, wherein a length of the inlet face and/or of the outlet face in a direction parallel to the main gas inflow direction and the main gas outflow direction, respectively, is at least 40 times larger than the distance (d) between the sheets in the layer.

3. The gas separation unit according to claim 1, wherein the flexible fabric material is woven or nonwoven textile material, or the flexible fabric material is made from a cellulose based material.

4. The gas separation unit according to claim 1, wherein more than 5 layers are either
   stacked essentially parallel to each other in the unit; and/or
   stacked under relative inclination angles in the range of 0.2-15°, the corresponding inlet channels converging in the main gas inflow direction and the corresponding outlet channels widening in the main gas outflow direction.

5. The gas separation unit according to claim 1,
   wherein the layers are essentially planar structures stacked essentially parallel to each other, or
   wherein the layers are essentially cylindrical structures arranged concentrically to each other.

6. The gas separation unit according to claim 1, wherein spacers are located within said layers.

7. The gas separation unit according to claim 1, wherein the at least two stacked layers, or in case of more than two layers all the layers comprising two sheets of a flexible fabric material which is gas permeable but impermeable to the loose particulate sorbent material contained in the layers, are oriented vertically, such that the plane normals of the layers are oriented horizontally.

8. The gas separation unit according to claim 1, wherein the primary heat exchange elements and/or any secondary heat exchange elements also act as frame structure supporting the sheets of flexible fabric material.

9. The gas separation unit according to claim 1, wherein the primary heat exchange elements and/or any secondary heat exchange elements are made of expanded material.

10. The gas separation unit according to claim 1, wherein the loose particulate sorbent material is an amine-modified particulate material.

11. The gas separation unit according to claim 1,
    wherein the frame is provided with holes into which the loose particulate sorbent material is filled, and
    wherein openings of said holes are closed after filling in the sorbent material.

12. The gas separation unit according to claim 1, further comprising a surrounding cage, which, apart from gas inlet openings for the inflow and gas outlet openings for the outflow is gastight.

13. The gas separation unit according to claim 1,
    wherein the sheets of each layer are located at a distance between the sheets in the range of 0.5-1.5 cm, or
    wherein the mean distance between adjacent inlet faces or outlet faces, measured in a direction essentially parallel to a main gas inflow direction and the main gas outflow direction, respectively, is in the range of 0.5-1.5 cm.

14. The gas separation unit according to claim 1, wherein a length of at least one of the inlet face or of the outlet face in a direction parallel to the main gas inflow direction and the main gas outflow direction, respectively, is at least 80 times larger than the distance (d) between the sheets in the layer.

15. The gas separation unit according to claim 1, wherein the flexible fabric material is woven or nonwoven textile material, based on polymeric fibres or yarns, including those based on at least one of PET or PE, or the flexible fabric material is made from a cellulose based paper material.

16. The gas separation unit according to claim 1, wherein more than 20 layers are either:
    stacked essentially parallel to each other in the unit, by using a stack of corresponding frames; or
    stacked under relative inclination angles in the range of 0.5-10°, the corresponding inlet channels converging in the main gas inflow direction and the corresponding outlet channels widening in the main gas outflow direction,
    wherein the inlet channels are closed at their downstream ends by lateral edges of adjacent layers being in contact, and
    wherein the outlet channels are closed at their upstream end by lateral edges of adjacent layers.

17. The gas separation unit according to claim 1, wherein spacers are located within said layers, the spacers being rigid bar or rail structures, including T, H, C, or Z-bar structures, or being provided by junctures or seams between the sheets.

18. The gas separation unit according to claim 1, wherein at least one layer, or the majority of the layers, or all layers are provided with said primary heat exchange elements, in the form of tubing containing said heat transfer fluid, in combination with secondary heat exchange elements for increasing the heat transfer between the sorbent material and the heat exchange elements.

19. The gas separation unit according to claim 18, wherein the primary heat exchange elements or the secondary heat exchange elements also act as frame structure supporting the sheets of flexible fabric material.

20. The gas separation unit according to claim 18, wherein the secondary heat exchange elements are made of expanded metal, including a corrugated expanded metal.

21. The gas separation unit according to claim 1, wherein the loose particulate sorbent material is an amine-modified particulate material, based on amine-modified nanofibrilated cellulose with an average particle diameter in the range of 60 to 1200 μm, for the adsorption of carbon dioxide.

22. The gas separation unit according to claim 1, further comprising a surrounding cage, made of a flexible or a stiff material, which, apart from gas inlet openings for the inflow and gas outlet openings for the outflow is gastight, and which is attached to a vacuum unit for the desorption process,
    wherein inlet openings and/or outlet openings are provided with controllable lids or valves for changing between adsorption and desorption stages.

23. The gas separation unit according to claim 1, wherein the loose particulate sorbent material is an amine-modified particulate material, based on a weak basic ion exchange resin, with adsorbing amine groups, including polystyrene matrix materials modified with amine groups, including primary amine groups, for the adsorption of carbon dioxide.

24. A method of using a gas separation unit according to claim 1 for extracting carbon dioxide from air or flue gases, comprising:
    operating the gas separation unit in a cyclic adsorption/desorption process where during an adsorption step air is ventilated through the gas separation unit and a portion of the $CO_2$ contained in the air is bound at the surface of the particulate sorbent material contained in the sorbent material layers of the gas separation unit.

25. A gas separation unit for the separation of a first gas from a gas mixture containing said first gas as well as further gases different from the first gas by using a cyclic adsorption/desorption process using a loose particulate sorbent material for gas adsorption,
    wherein said particulate sorbent material is arranged in at least two stacked layers,
    wherein each layer comprises two sheets of a flexible fabric material which is gas permeable but impermeable to the loose particulate sorbent material, which sheets:
    are either mounted on a stiff frame structure or form the layer in a self-supporting way using spacers or distance elements between them,
    are arranged essentially parallel defining an inlet face of the layer and an outlet face of the layer,
    are arranged with a distance between the sheets in the range of 0.5-2.5 cm, and
    are enclosing a cavity in which the particulate sorbent material is located,
    wherein the unit has a gas inlet side or gas inlet manifold through which a gas inflow of the gas mixture enters the unit and a gas outlet side or gas outlet manifold through which a gas outflow exits the unit, a gas pathway between the gas inflow and the gas outflow being confined in the unit to pass through at least one layer,
    wherein said layers are arranged in the unit such that the gas inflow passes through the inlet face, subsequently through the particulate sorbent material located in the cavity of the respective layer, subsequently to exit the respective layer through the outlet face to form the gas outflow,
    wherein the layers are arranged such that inlet faces of adjacent layers are facing each other enclosing gas inlet channels and such that outlet faces are facing each other enclosing gas outlet channels,
    wherein a mean distance between inlet faces and/or outlet face defining said channels, measured in a direction essentially perpendicular to a main gas inflow direction and a main gas outflow direction, respectively, is in the range of 0.5-5 cm,
    wherein a length of the inlet face and/or of the outlet face in a direction parallel to the main gas inflow direction and the main gas outflow direction, respectively, is at least ten times larger than distance (d) between the sheets in the layer,
    wherein at least one layer is provided with a primary heat exchange structure, wherein tubing is provided in each layer,
    wherein there are provided stackable backbone elements, in or as part of a frame structure,
    wherein means are provided in or at said stackable backbone elements for fluid transfer attachment of ends of the tubes,
    wherein the stackable backbone elements can be connected to each other, directly or via further tubing, involving using O-rings, to transfer a heat transfer fluid to and from the tubes in individual layers,
    wherein the stackable backbone elements are cylindrical elements with a diameter in the range of 1 to 5 cm, and
    wherein the tubing of the primary heat exchange structure as well as any secondary heat exchange structure can be directly included in the frame structures during an injection molding process.

* * * * *